(12) United States Patent
Barrett

(10) Patent No.: US 10,571,039 B1
(45) Date of Patent: Feb. 25, 2020

(54) SERVICEABLE VALVE CAROUSEL SYSTEM

(71) Applicant: Brett Franklin Barrett, Seabrook, TX (US)

(72) Inventor: Brett Franklin Barrett, Seabrook, TX (US)

(73) Assignee: CNB MARINE SOLUTIONS LLC, Kemah, TX (US)

( * ) Notice: Subject to any disclaimer, the term of this patent is extended or adjusted under 35 U.S.C. 154(b) by 0 days.

(21) Appl. No.: 16/502,411

(22) Filed: Jul. 3, 2019

Related U.S. Application Data

(60) Provisional application No. 62/832,196, filed on Apr. 10, 2019.

(51) Int. Cl.
*F16K 1/16* (2006.01)
*F16K 43/00* (2006.01)
(Continued)

(52) U.S. Cl.
CPC .......... *F16K 29/00* (2013.01); *F16K 27/0227* (2013.01); *F16K 43/003* (2013.01); *F16K 15/144* (2013.01)

(58) Field of Classification Search
CPC ....... F16K 29/00; F16K 27/062; F16K 27/065
(Continued)

(56) References Cited

U.S. PATENT DOCUMENTS

| | | | |
|---|---|---|---|
| 1,992,319 A | * | 2/1935 | Maggenti ................. B65D 3/04 222/91 |
| 2,542,127 A | * | 2/1951 | Ewing ..................... F23N 5/107 137/66 |

(Continued)

FOREIGN PATENT DOCUMENTS

| | | |
|---|---|---|
| EP | 3351835 A1 | 7/2018 |
| GB | 1418245 A | 12/1975 |

(Continued)

OTHER PUBLICATIONS

International Search Report of the International Search Authority for PCT international application PCT/US2019/040492 dated Sep. 27, 2019.

(Continued)

*Primary Examiner* — Eric Keasel
*Assistant Examiner* — Kevin R Barss
(74) *Attorney, Agent, or Firm* — Basil M. Angelo; Angelo IP

(57) ABSTRACT

A serviceable valve carousel system may include a valve carousel housing having a first port adapter receiver, a valve service port, and a second port adapter receiver. A rotatable valve carousel may be disposed within the valve carousel housing. The rotatable valve carousel may include a valve lumen and a removable valve cap. A first port adapter may be removably attached to the first port adapter receiver and a second port adapter may removably attached to the second port adapter receiver. The first port adapter and the second port adapter may be of a type or kind needed to facilitate connectivity. The rotatable valve carousel may be rotatable between a first state that allows fluid communication between the first port adapter and the second port adapter through a check valve and a second state that allows the worn check valve to be removed and replaced via the valve service port.

14 Claims, 52 Drawing Sheets

(51) Int. Cl.
*F16K 29/00* (2006.01)
*F16K 27/02* (2006.01)
*F16K 15/14* (2006.01)

(58) Field of Classification Search
USPC .............. 137/512.2, 614.6, 614.17, 614.18; 251/309, 312, 286
See application file for complete search history.

(56) References Cited

U.S. PATENT DOCUMENTS

| | | | | |
|---|---|---|---|---|
| 3,160,388 A * | 12/1964 | Marentette | ................ | F16K 5/08 251/183 |
| 3,423,067 A * | 1/1969 | Foster | .................. | F16K 5/0471 251/309 |
| 3,474,818 A | 10/1969 | Hartman | | |
| 4,275,823 A * | 6/1981 | Credle, Jr. | ........... | B67D 1/0462 222/94 |
| 4,989,631 A * | 2/1991 | Harbin | ................. | F16K 5/0407 137/15.07 |
| 5,373,868 A * | 12/1994 | Rodriguez | ........... | F16K 5/0605 137/543 |
| 5,730,420 A * | 3/1998 | Tow | ..................... | F16K 5/0689 251/315.05 |
| 7,802,588 B2 * | 9/2010 | Doutt | ................... | F16K 11/044 137/606 |
| 2006/0196544 A1 | 9/2006 | Soderberg et al. | | |
| 2008/0099076 A1 | 5/2008 | Church | | |
| 2008/0236671 A1 | 10/2008 | Claude | | |
| 2014/0261808 A1 | 9/2014 | Brouwer et al. | | |
| 2015/0129043 A1* | 5/2015 | Hughes | ................ | F16K 15/188 137/12 |

FOREIGN PATENT DOCUMENTS

| | | |
|---|---|---|
| GB | 2157809 B | 9/1987 |
| JP | 2012197949 A | 10/2012 |
| WO | 2001088417 A1 | 11/2001 |

OTHER PUBLICATIONS

Written Opinion of Patentability of the International Search Authority for PCT international application PCT/US2019/040492 dated Sep. 27, 2019.

* cited by examiner

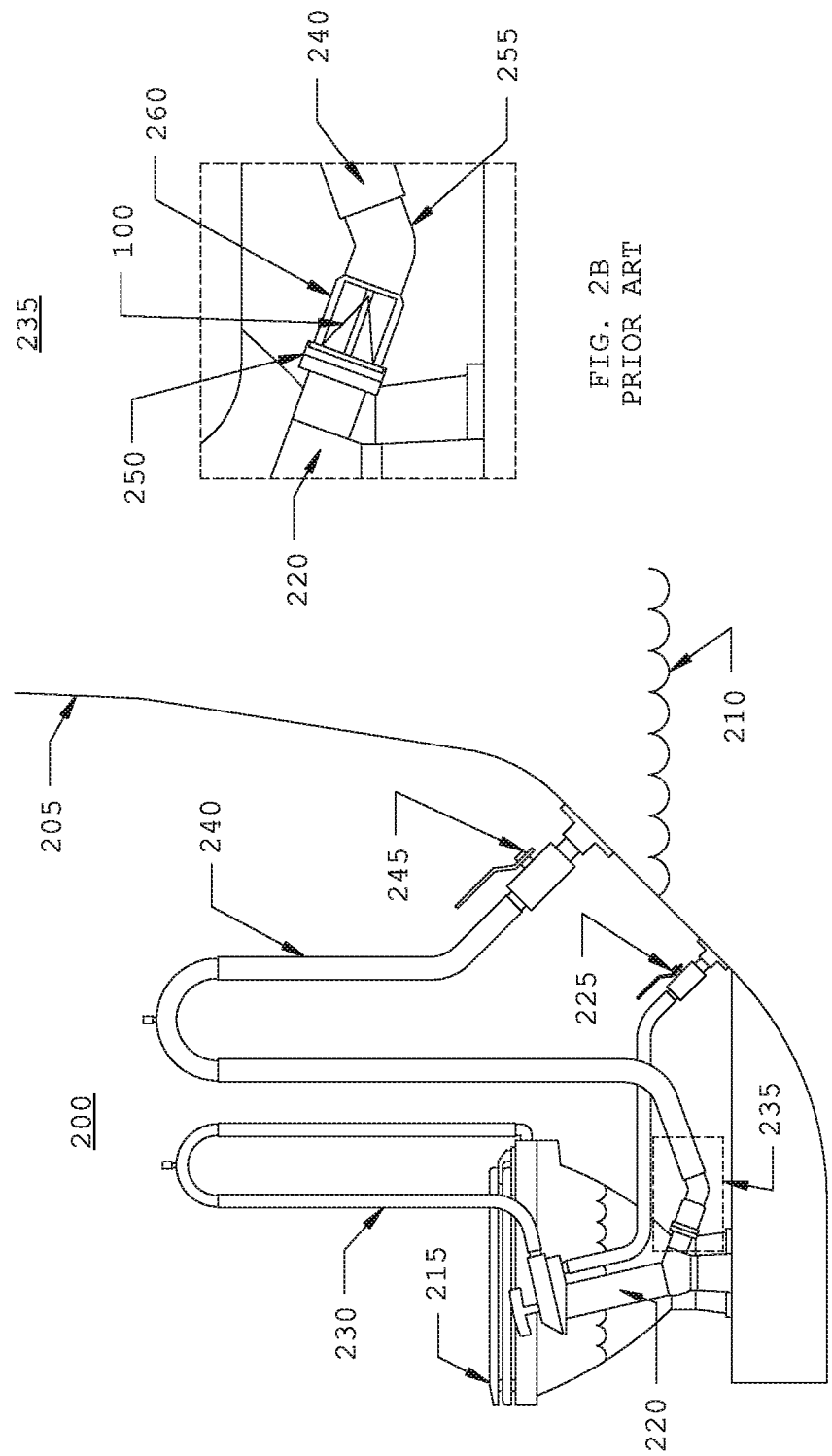

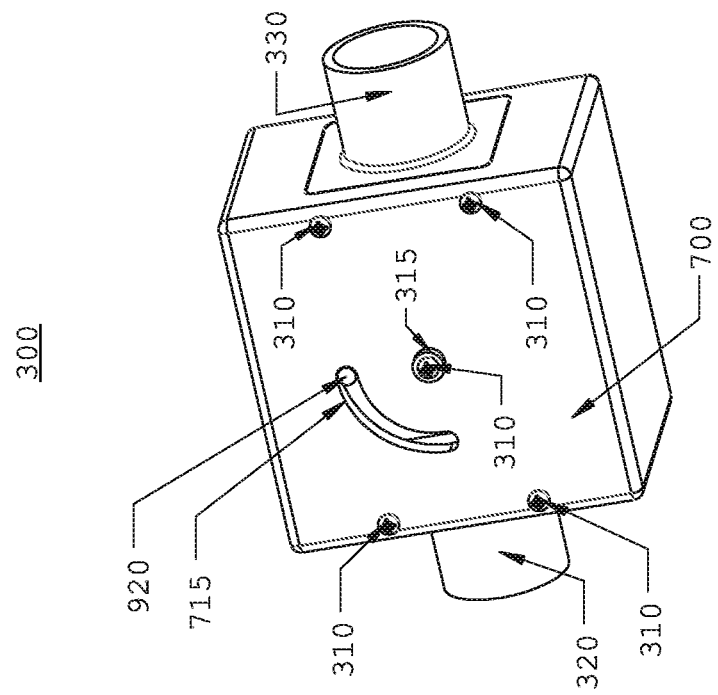
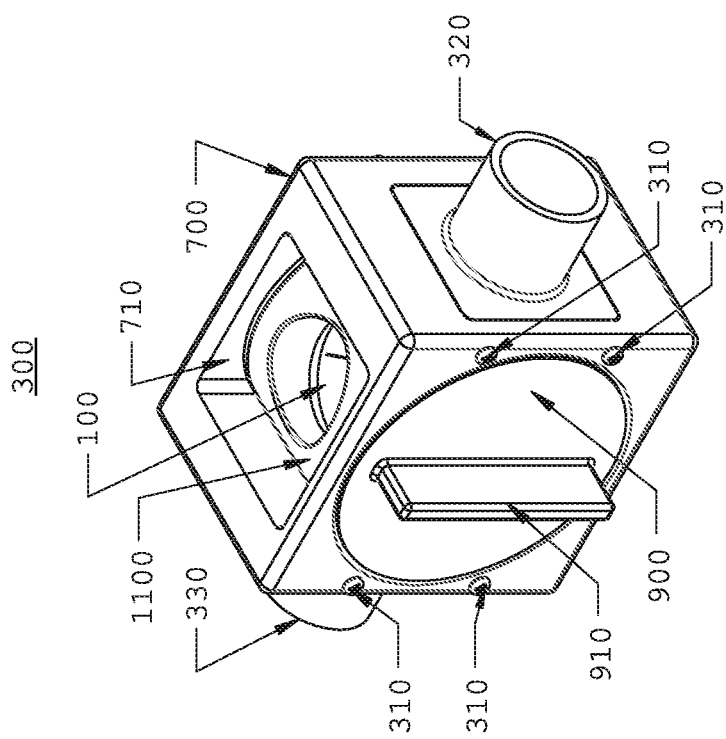

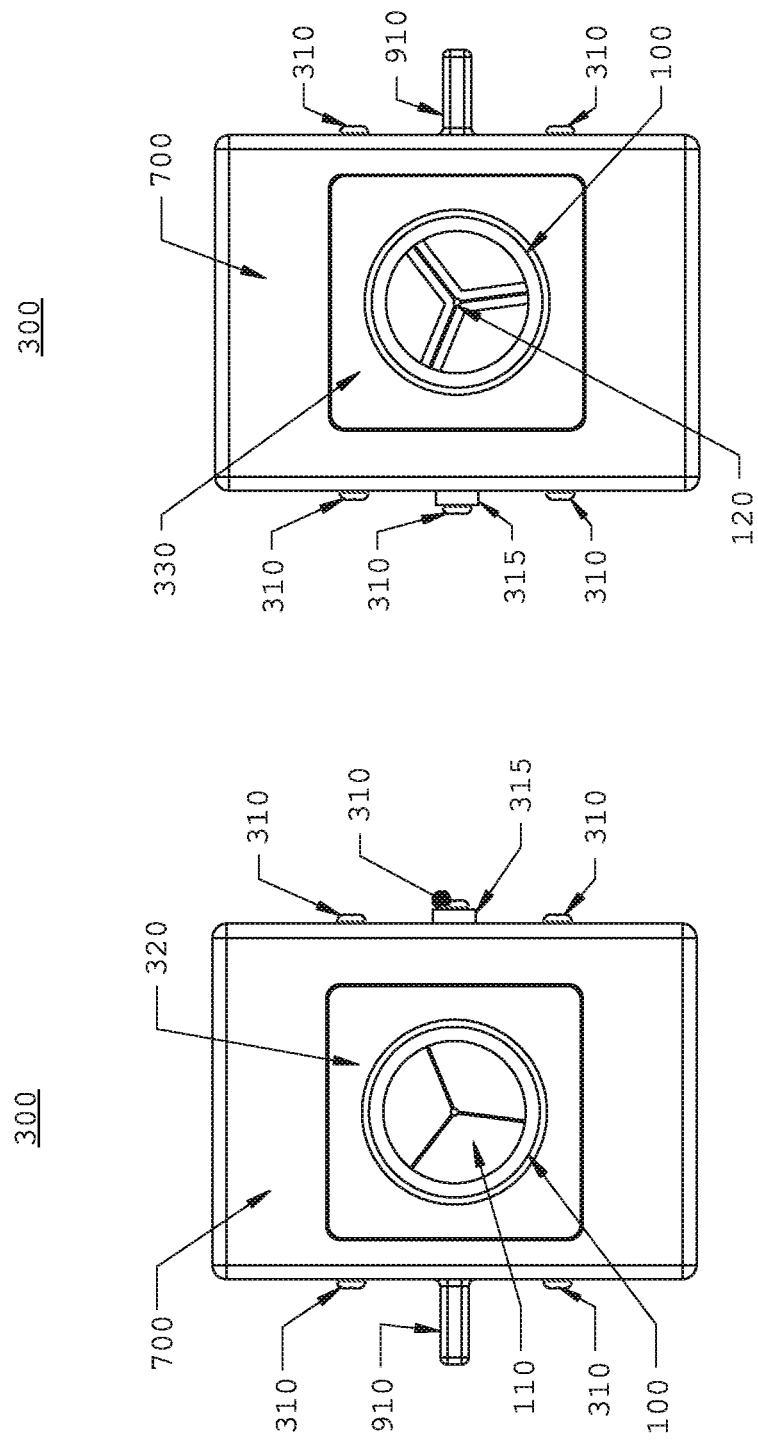

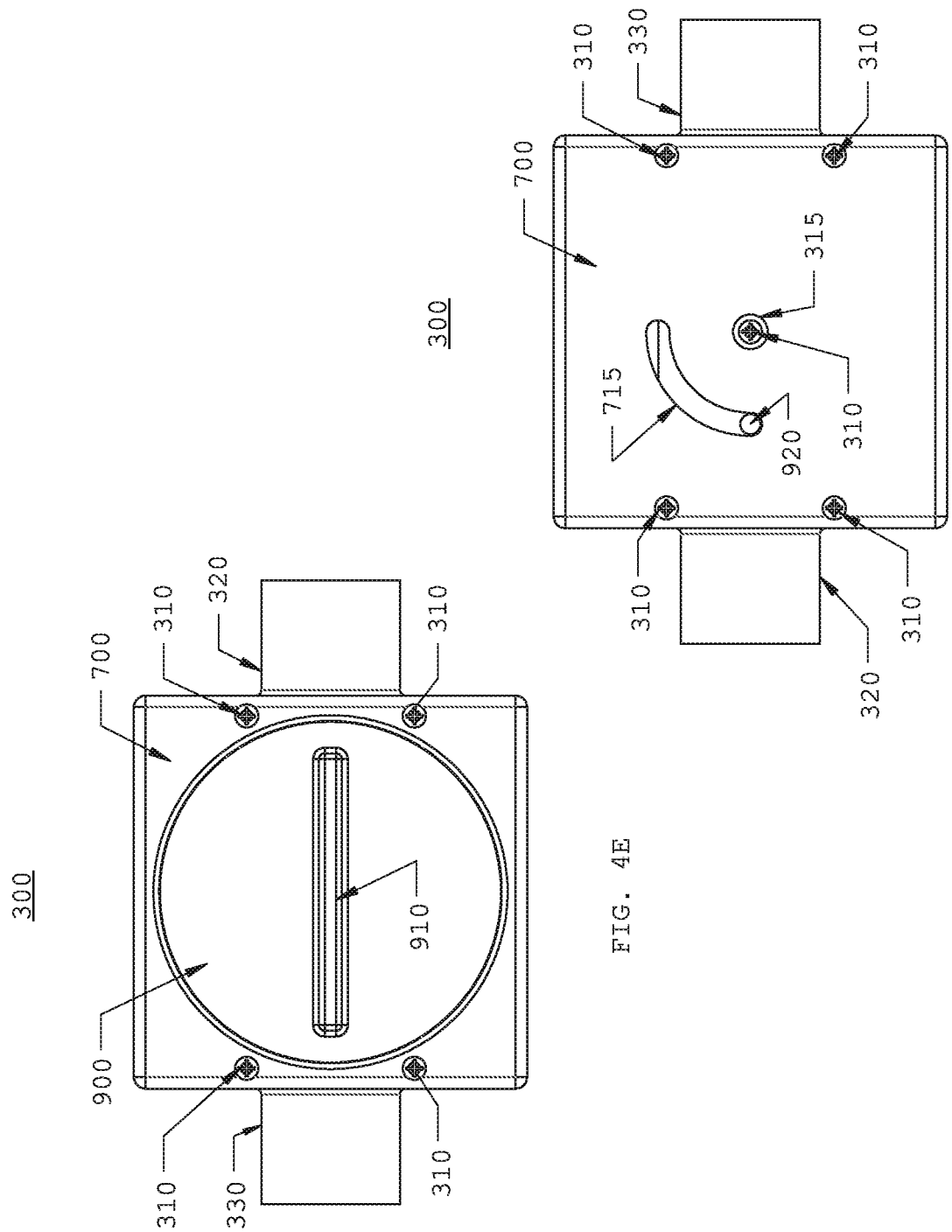

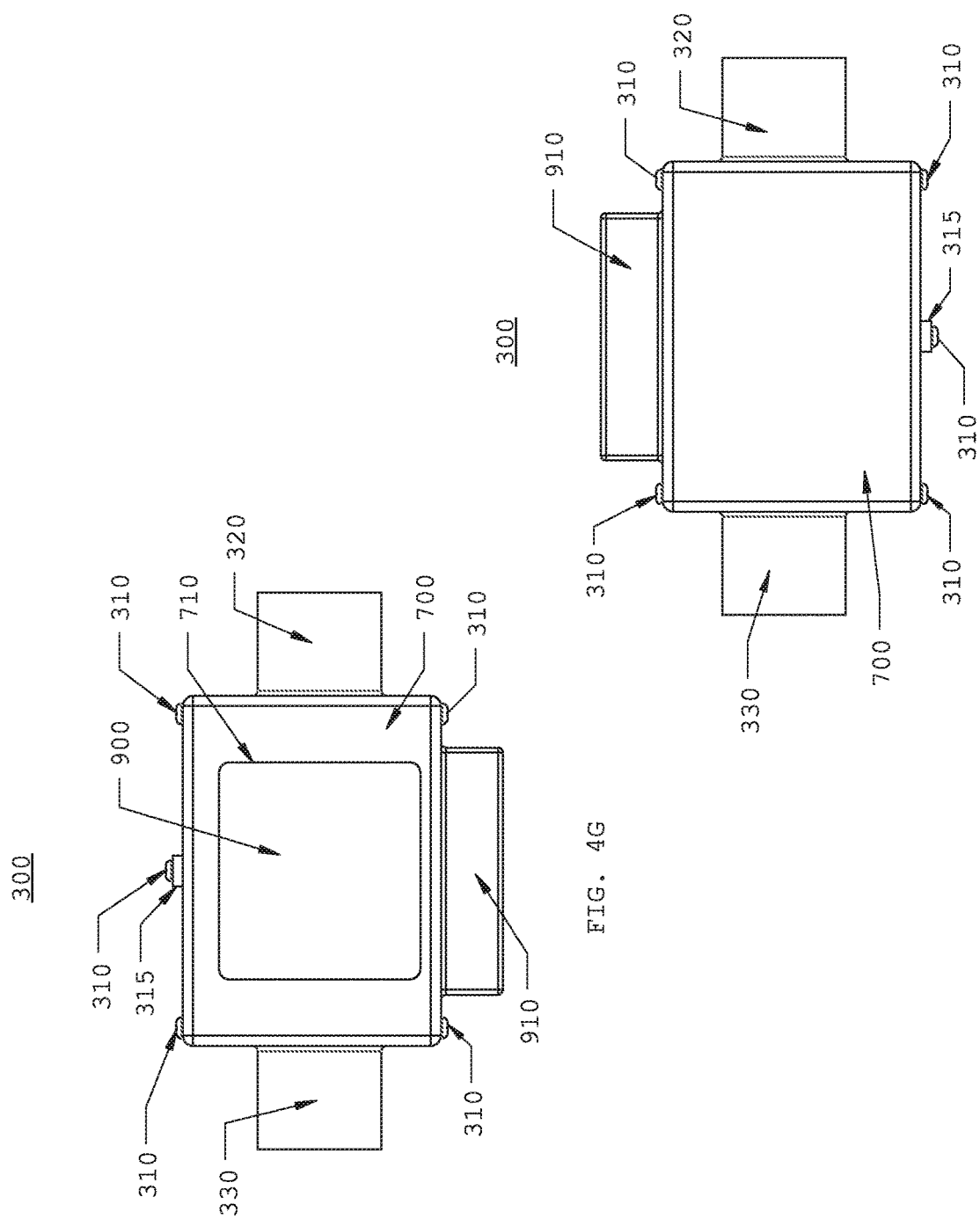

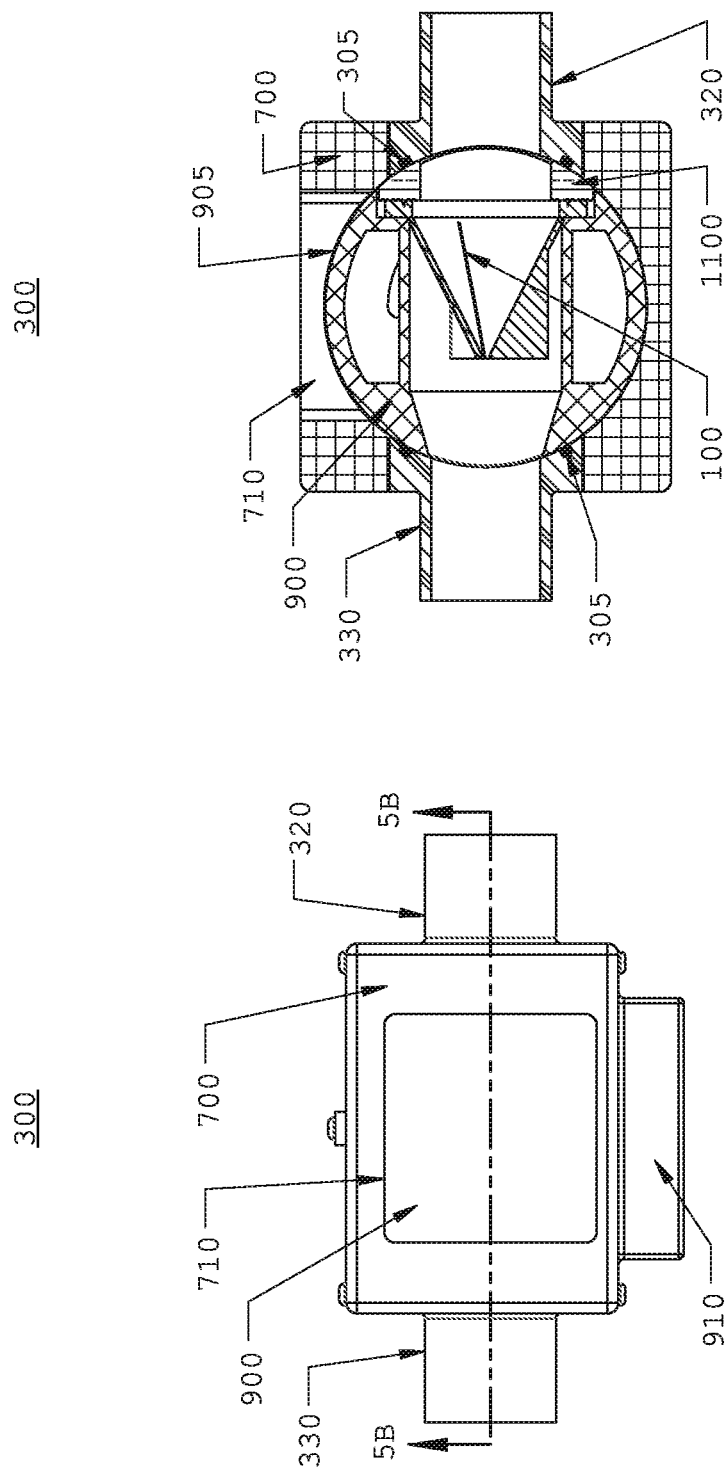

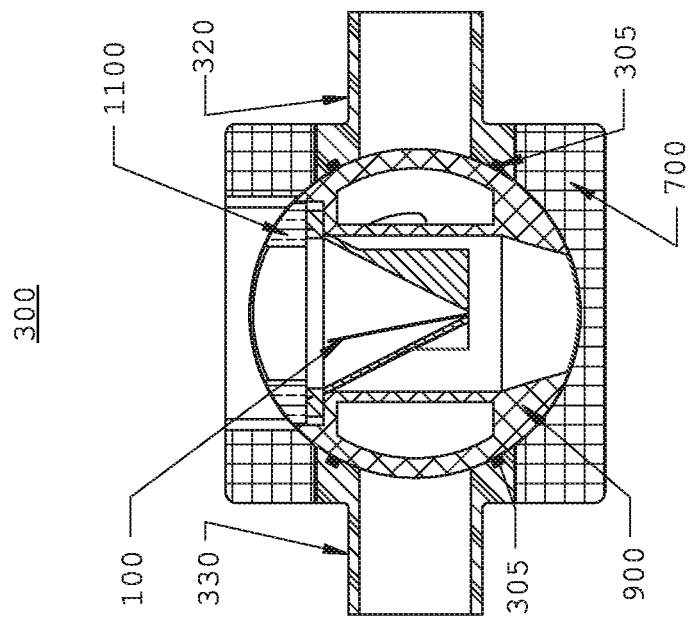
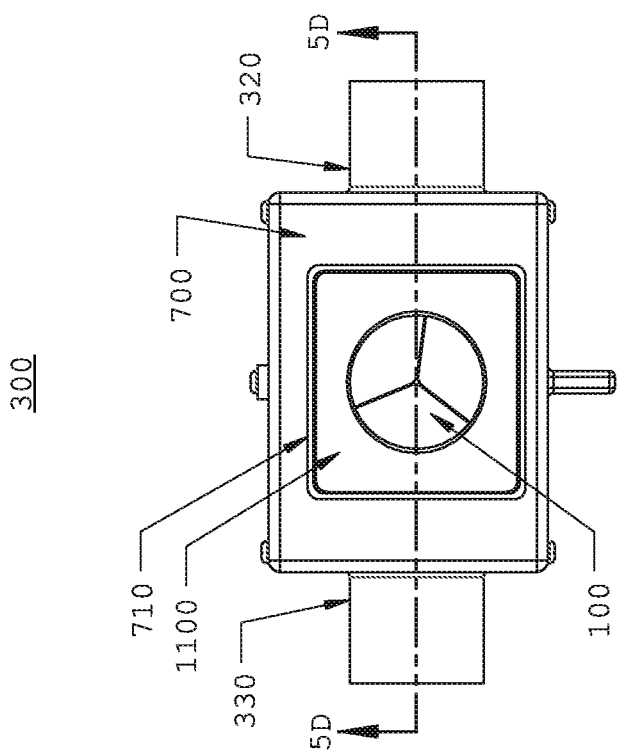
FIG. 5C
FIG. 5D

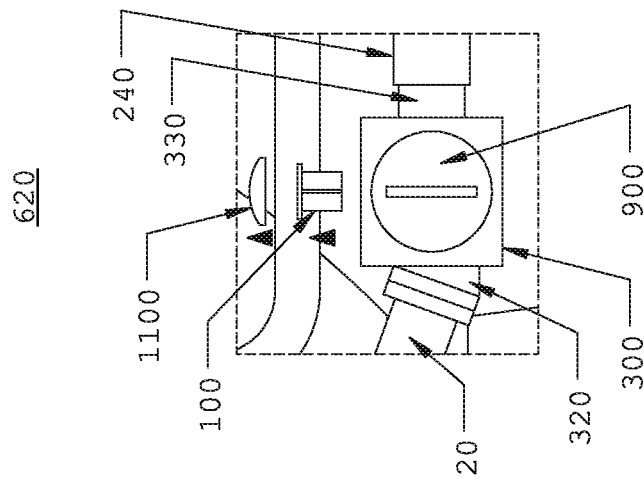
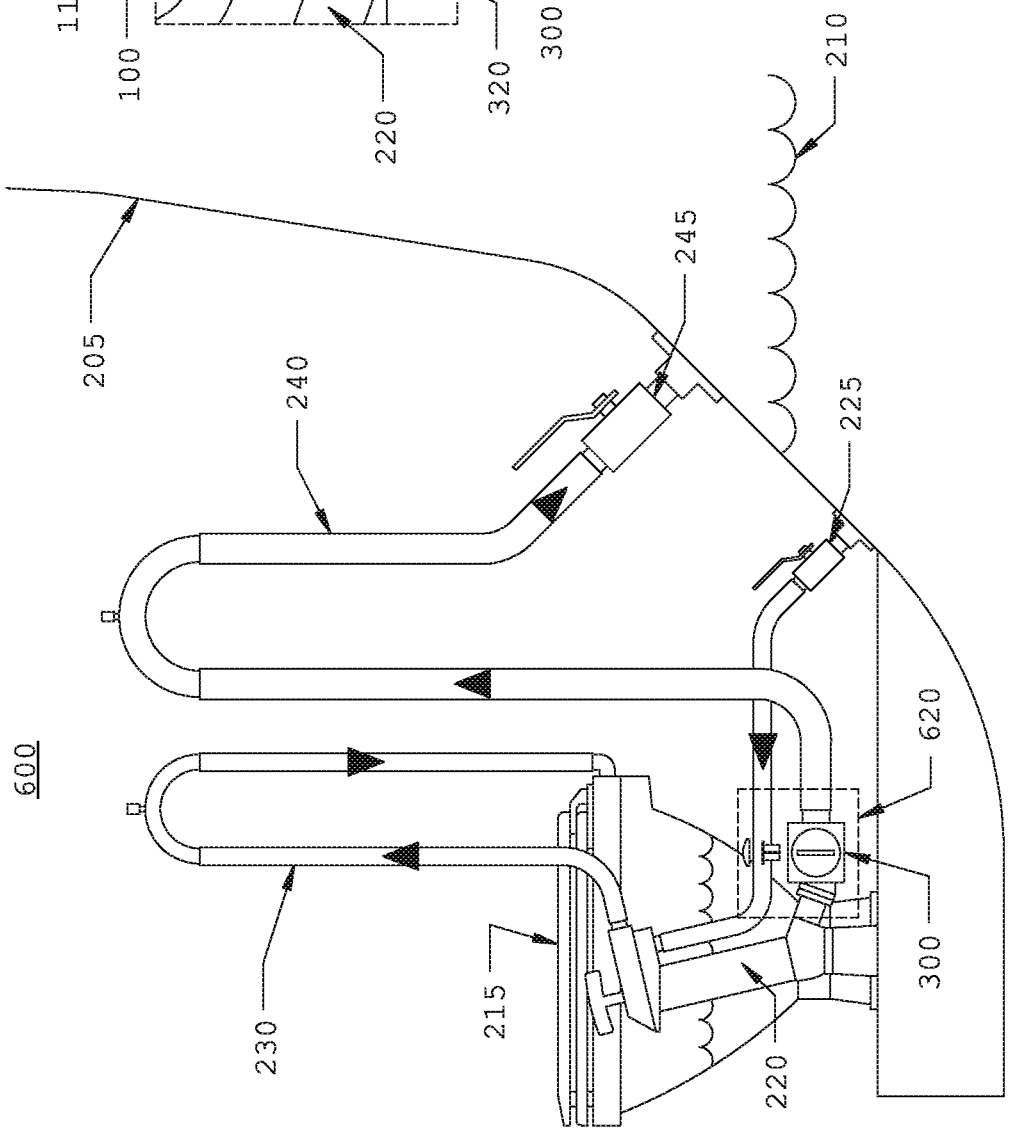
FIG. 6D
FIG. 6C

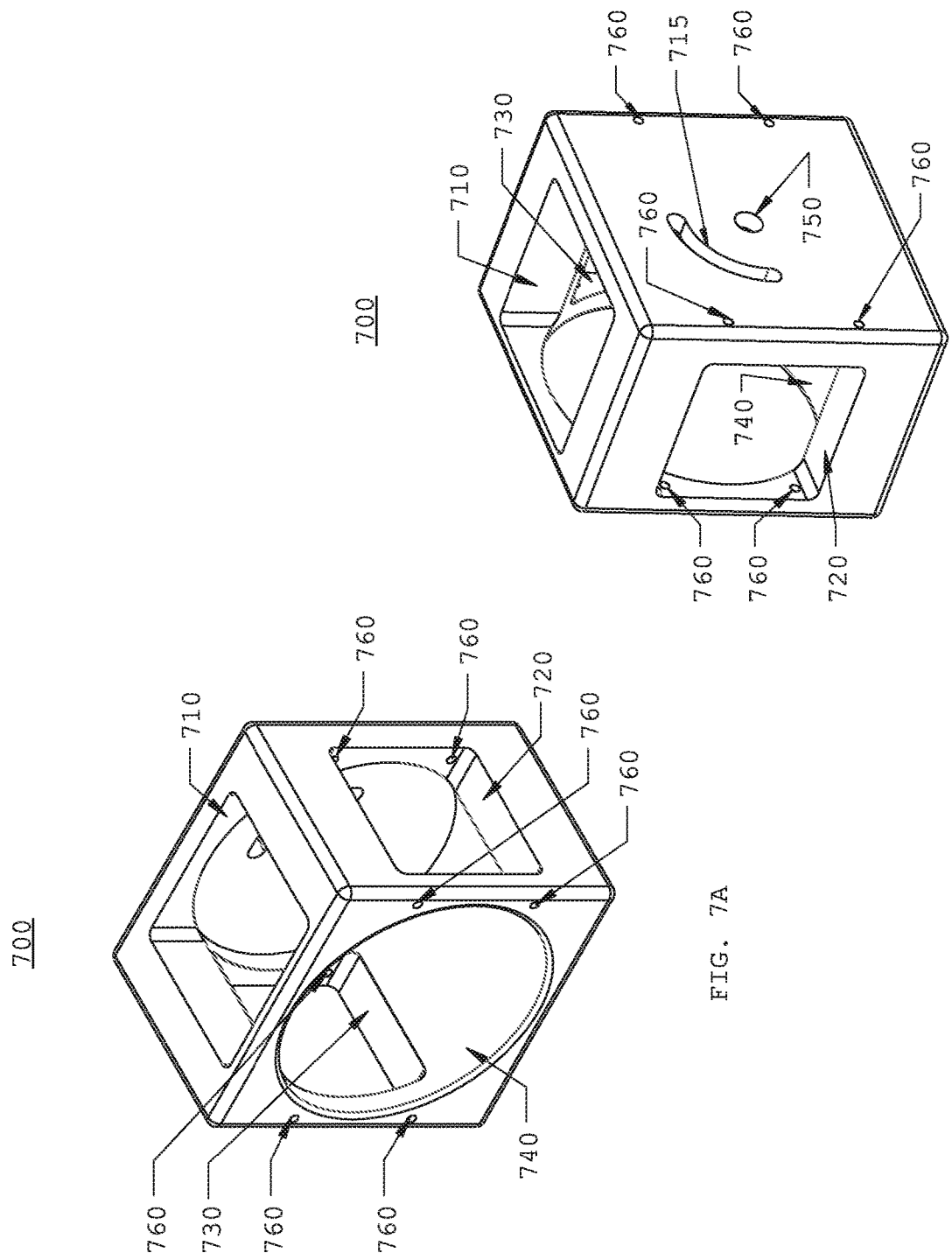

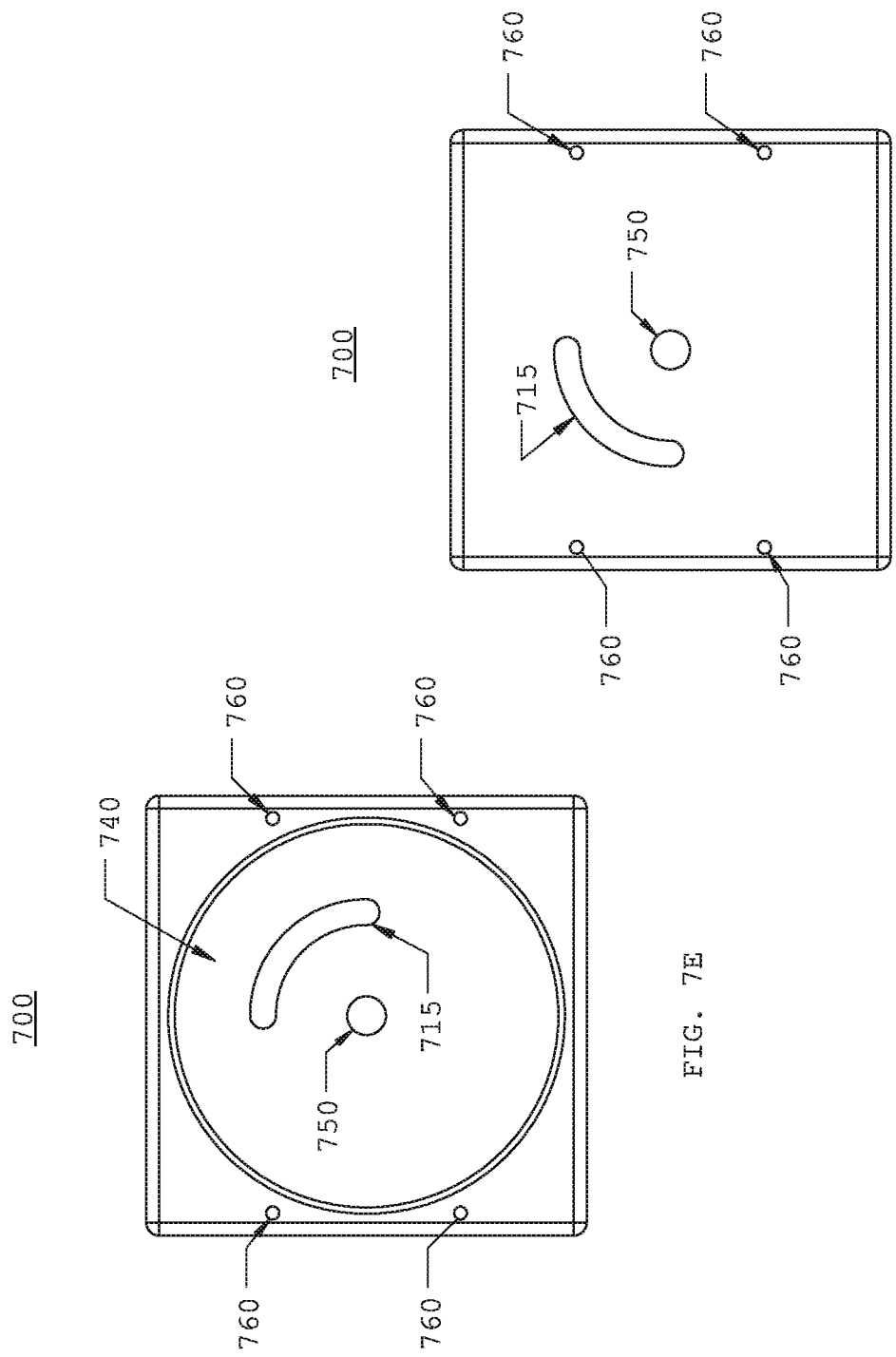

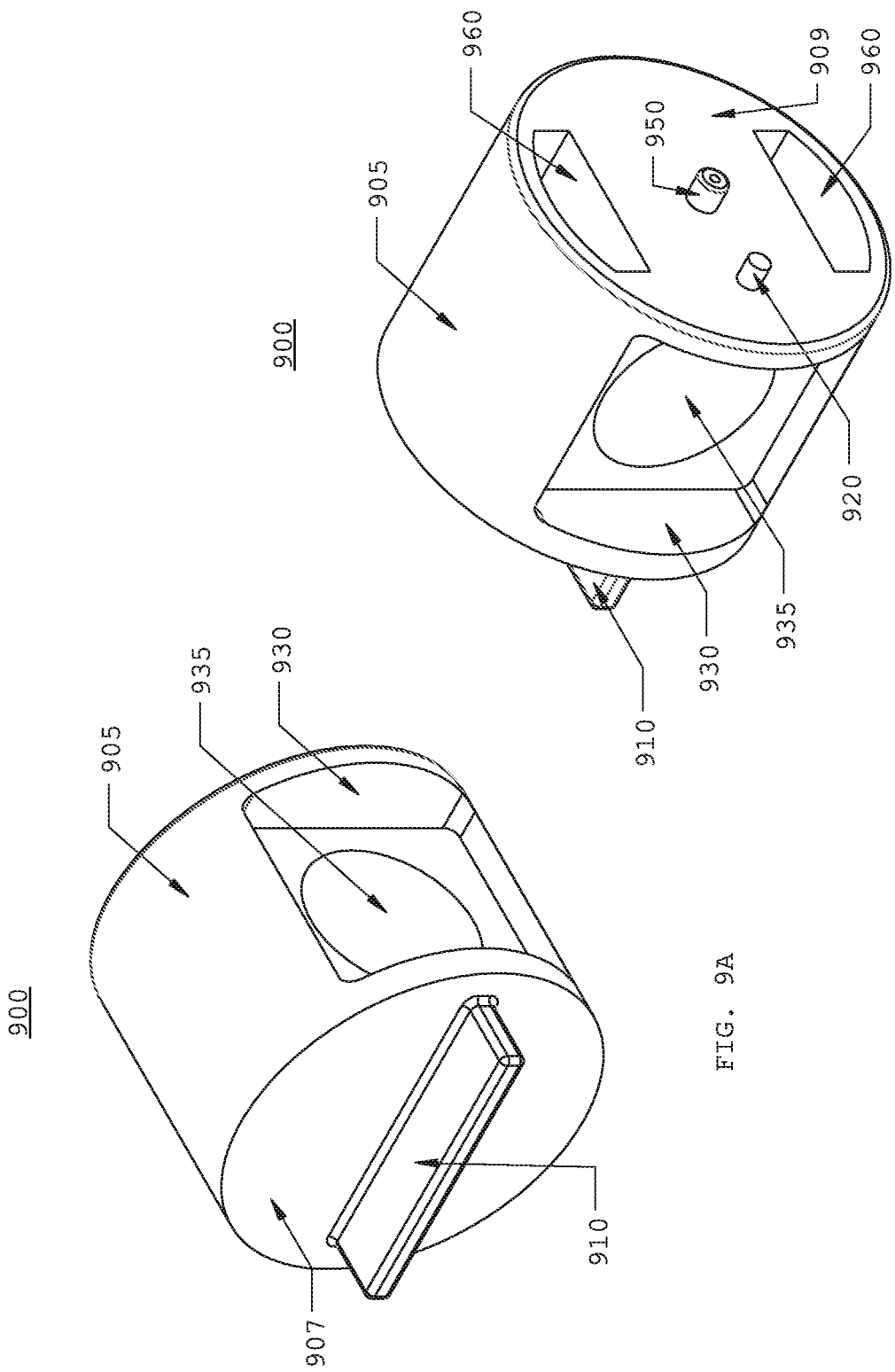

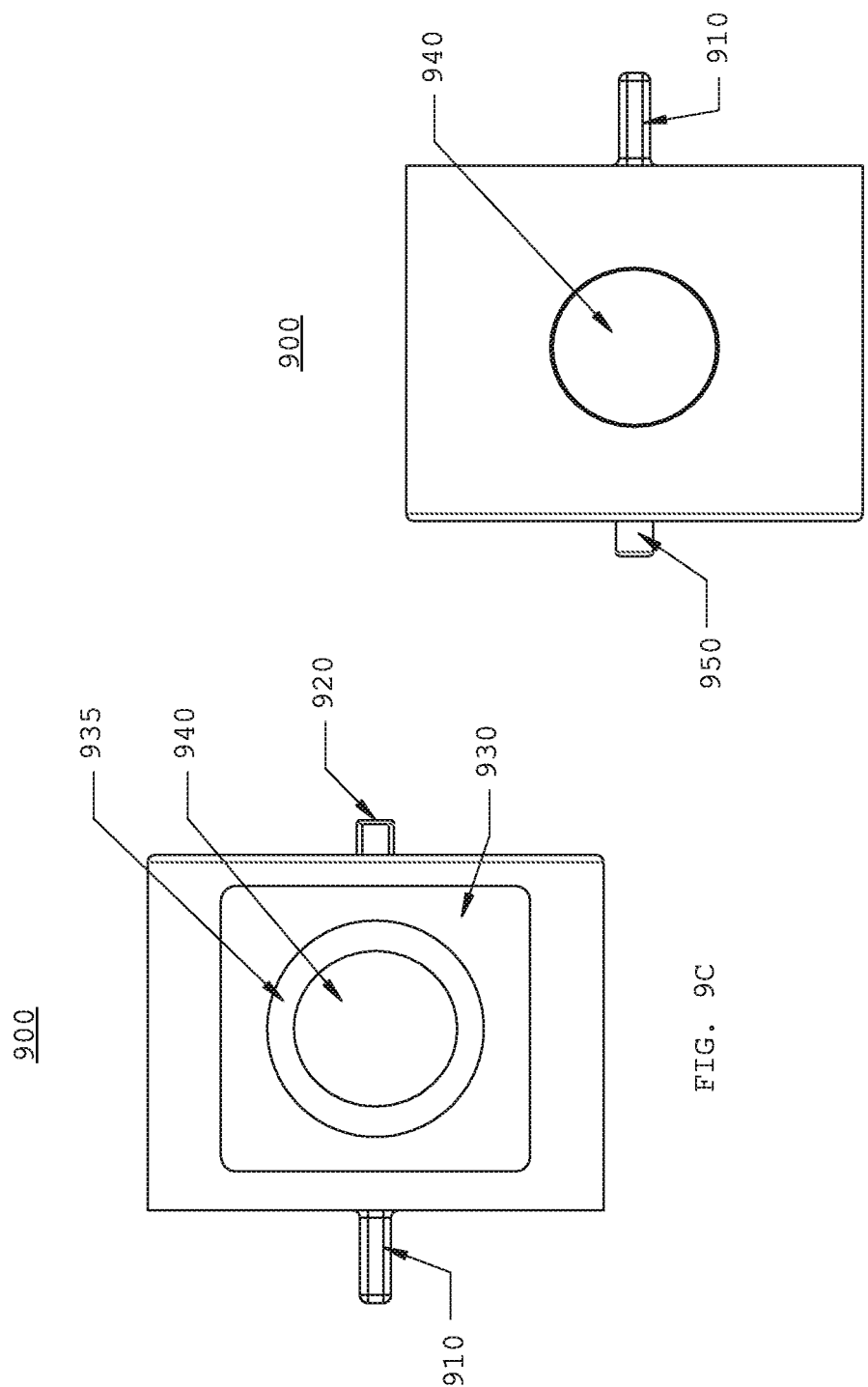

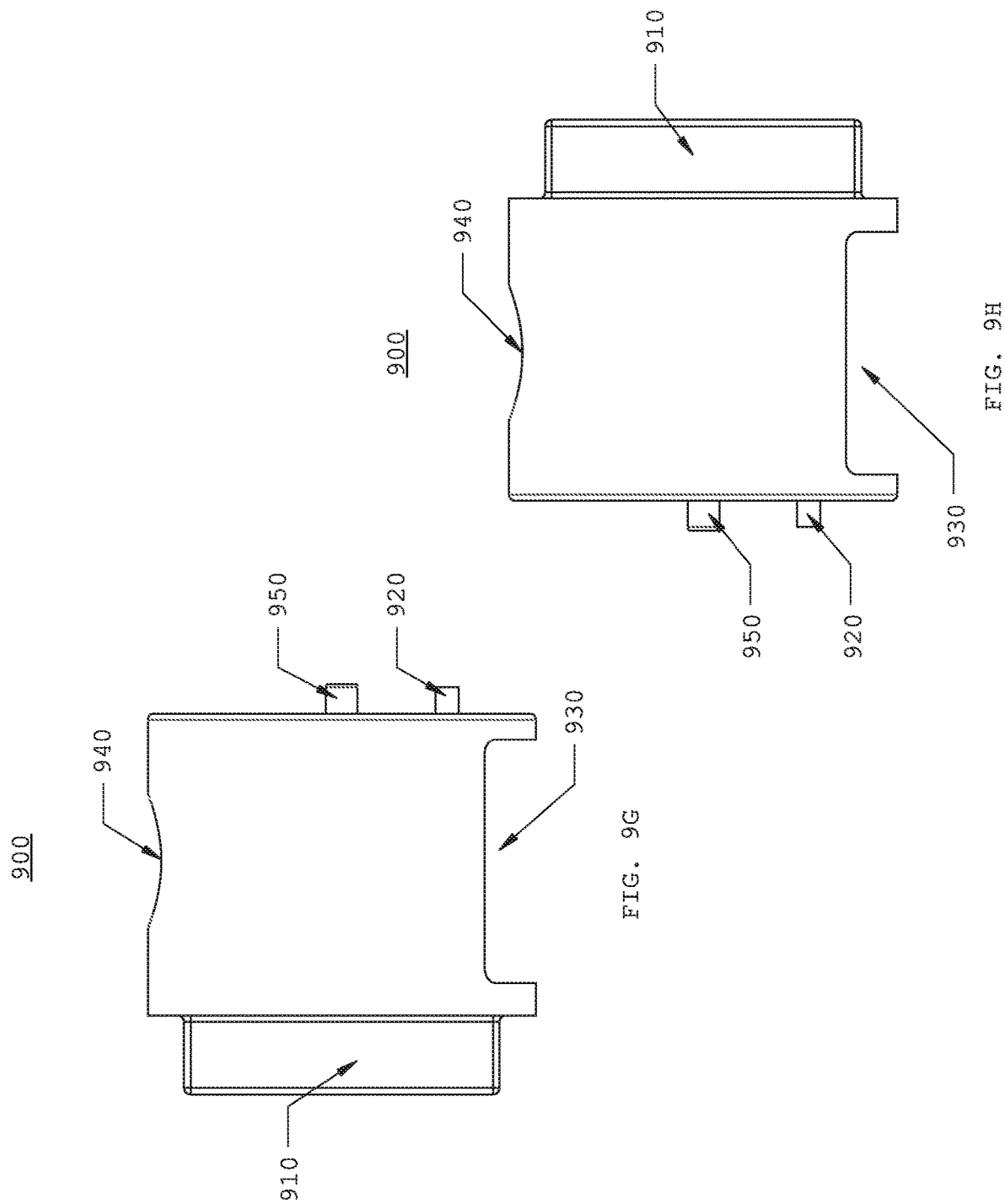

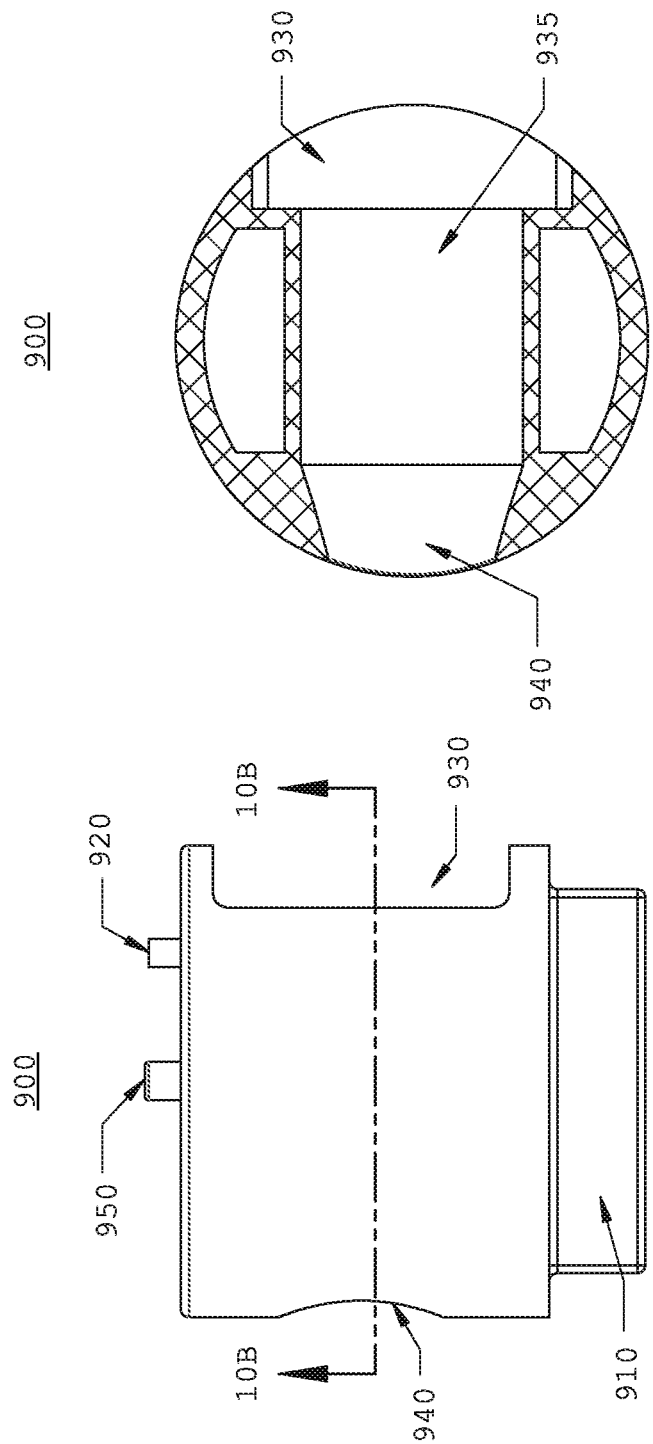

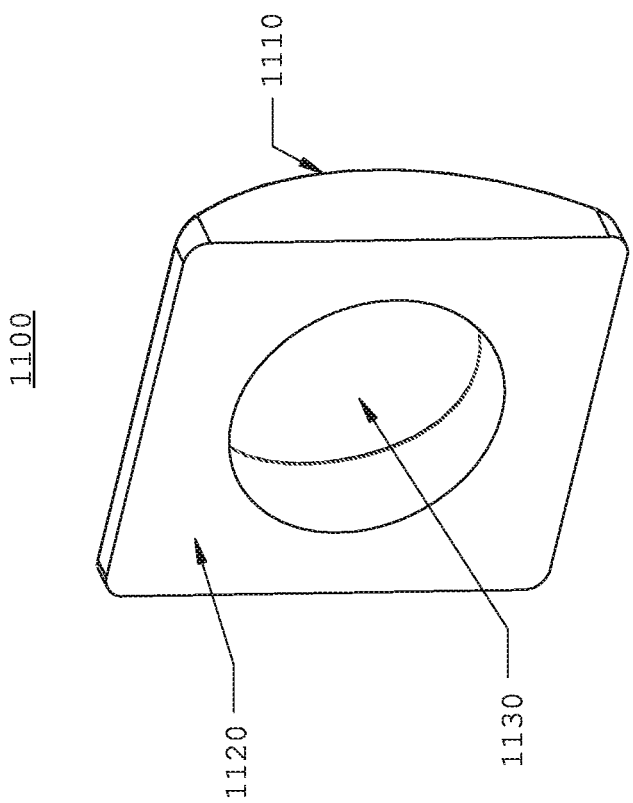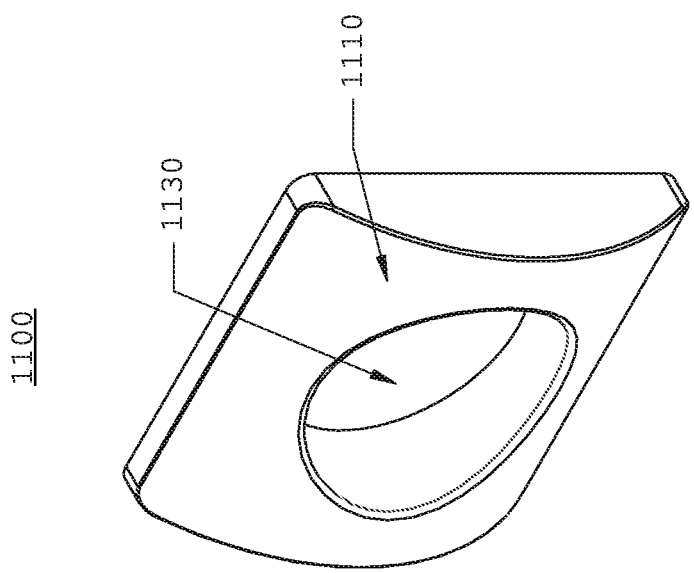

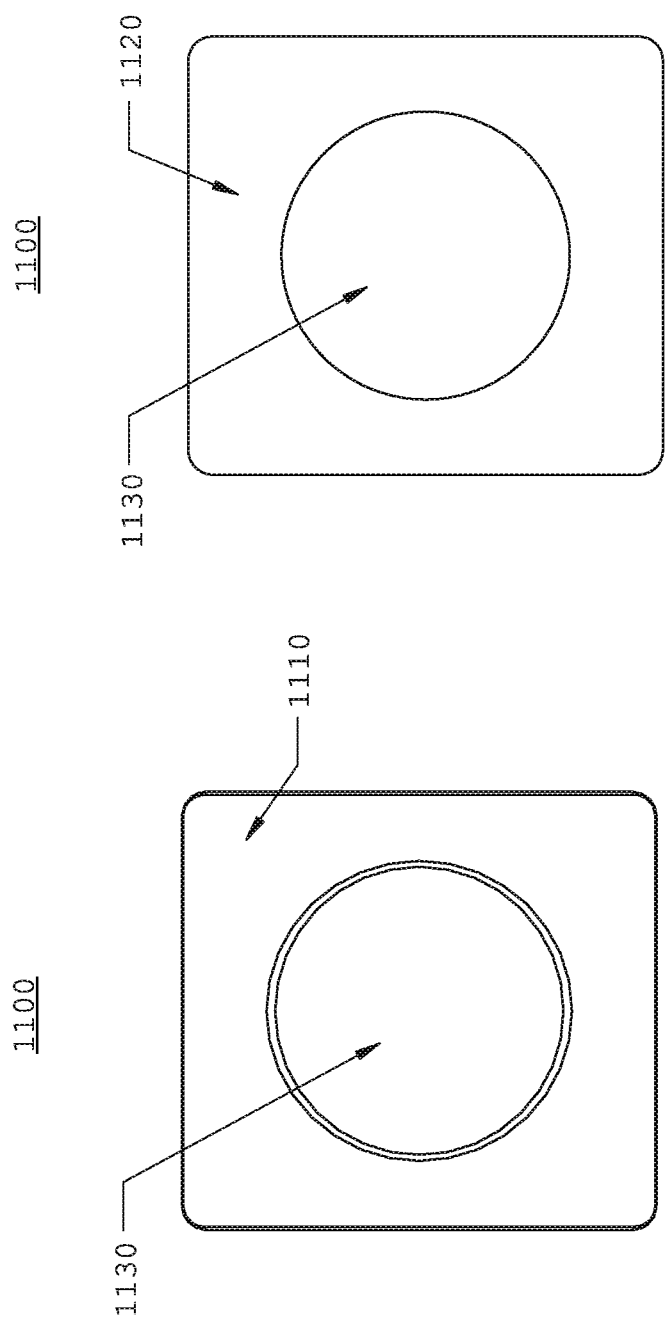

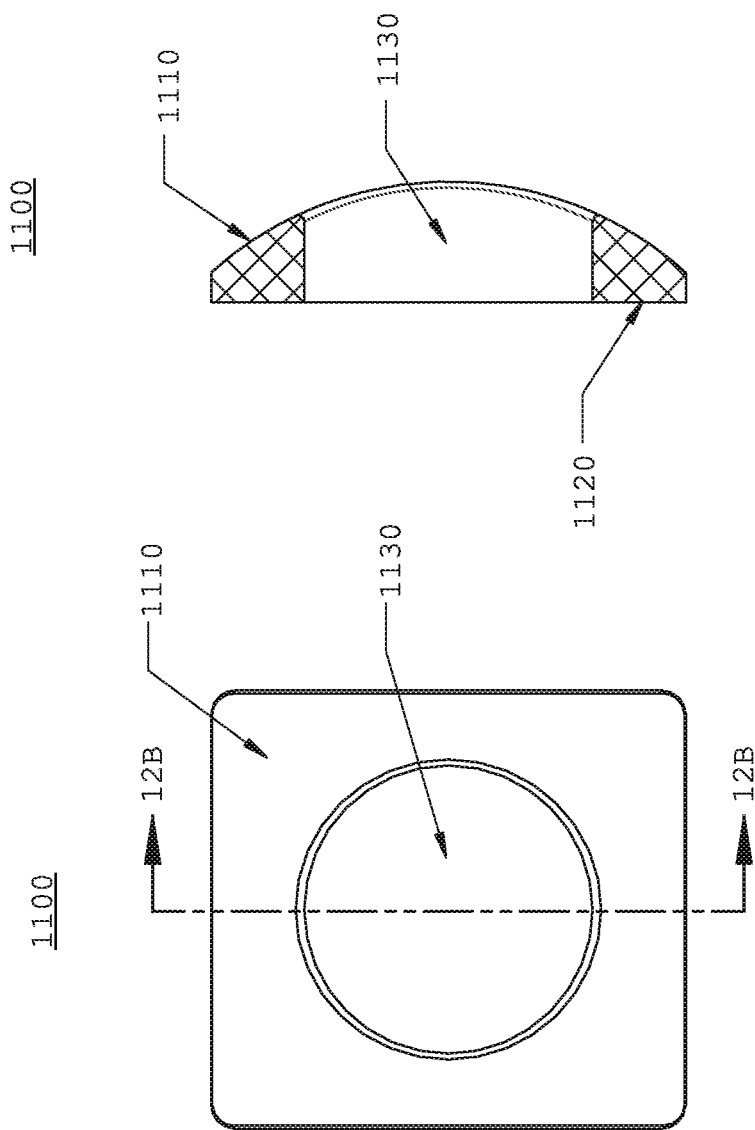

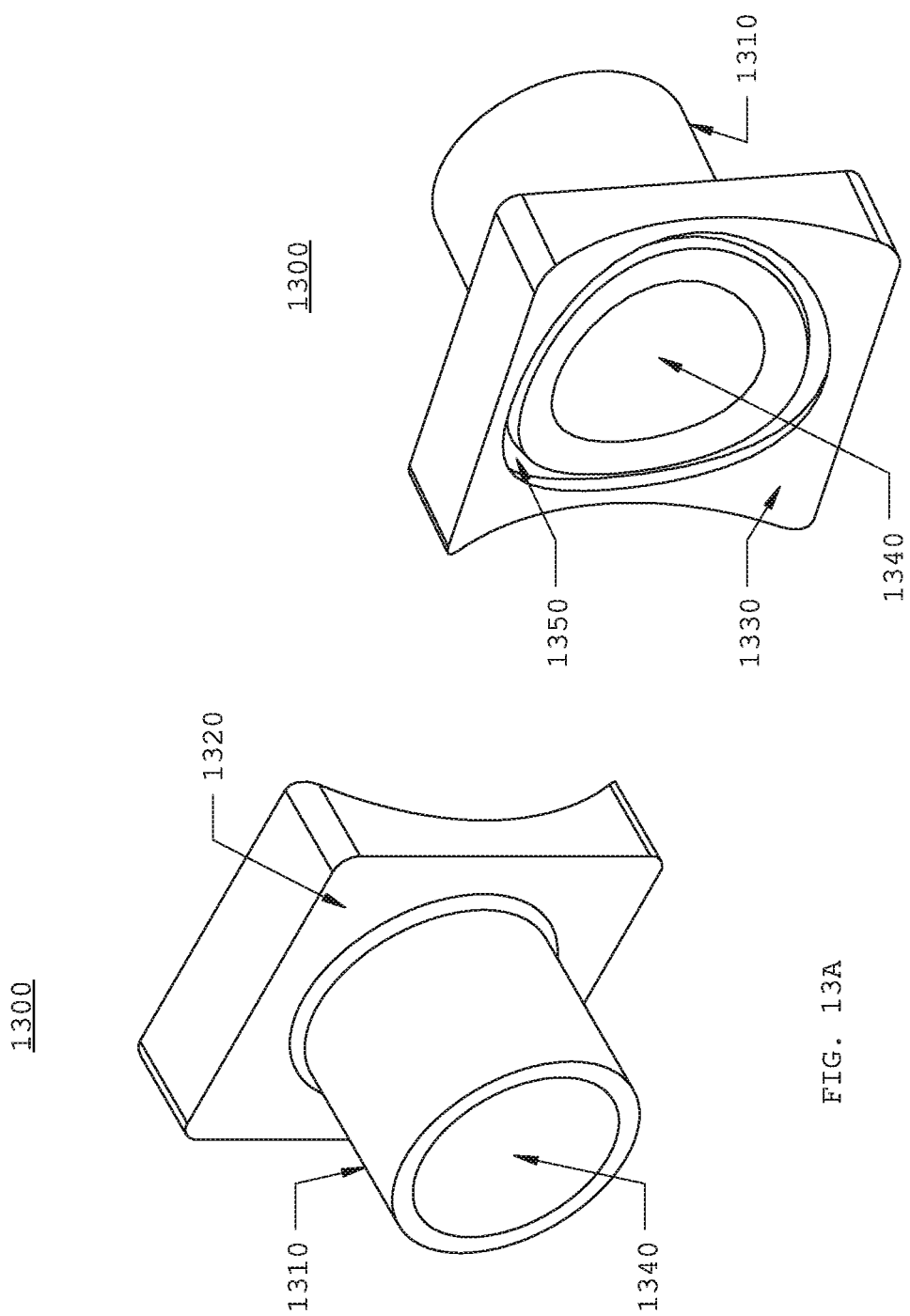

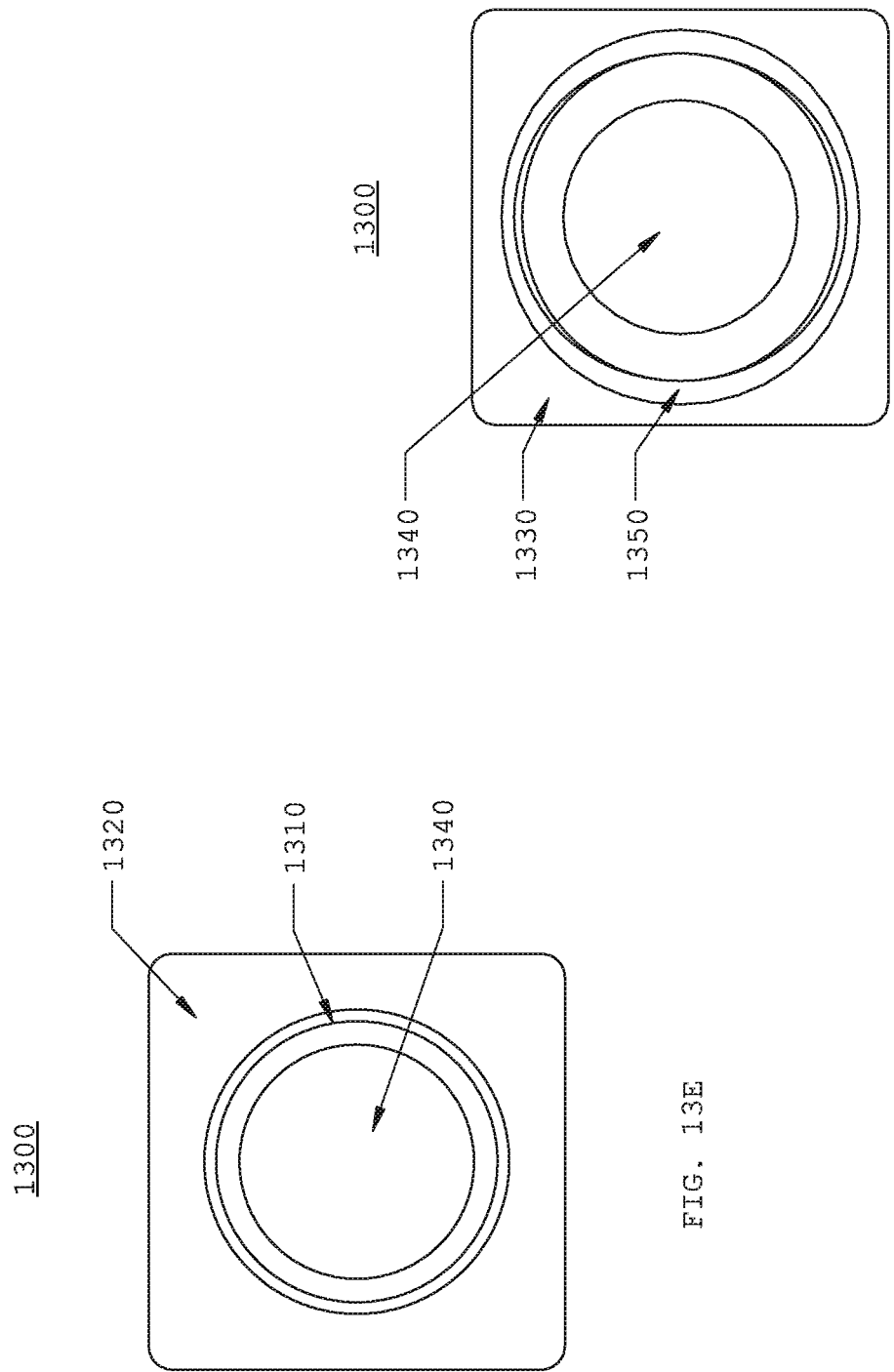

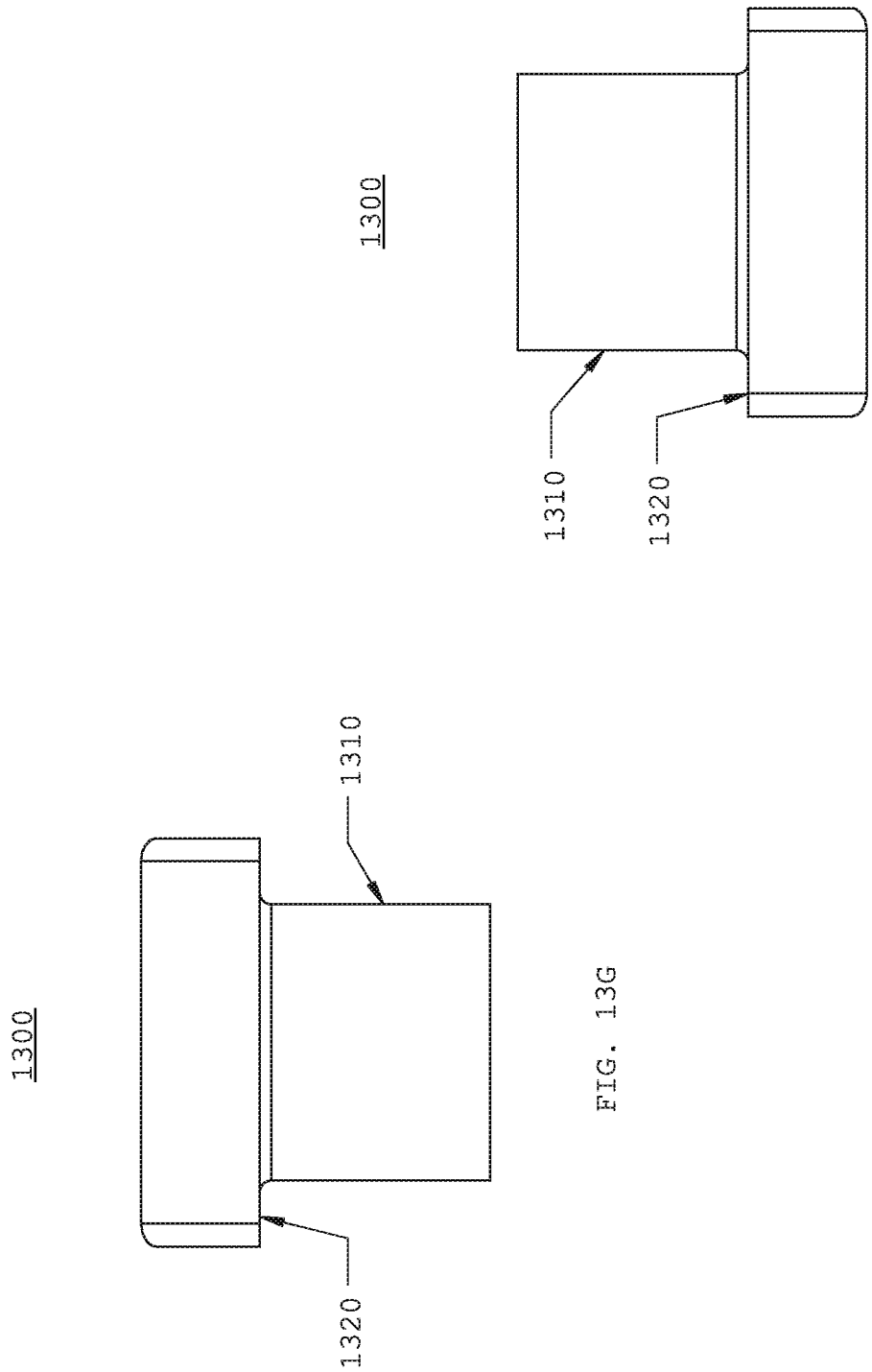

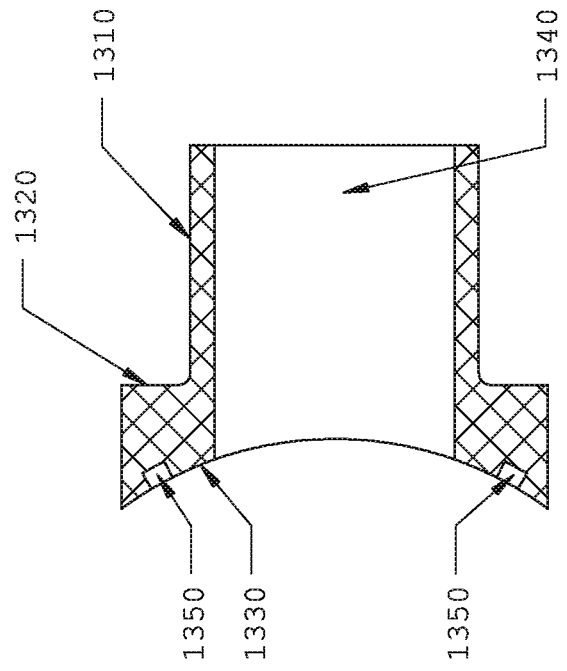
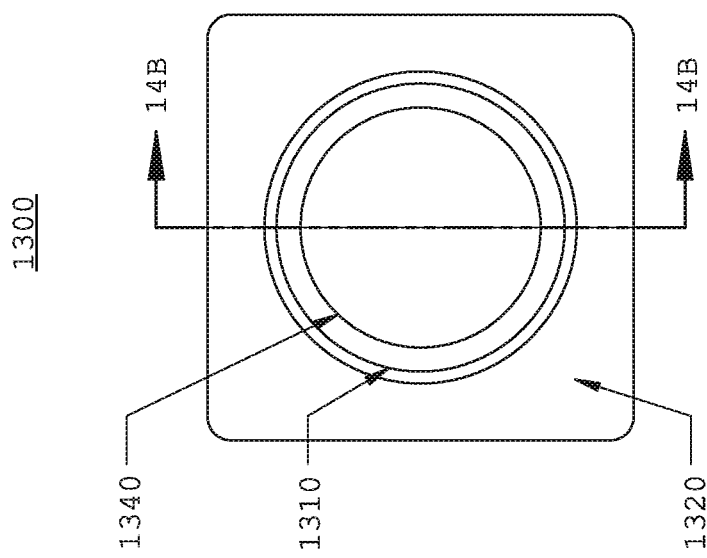
FIG. 14B
FIG. 14A

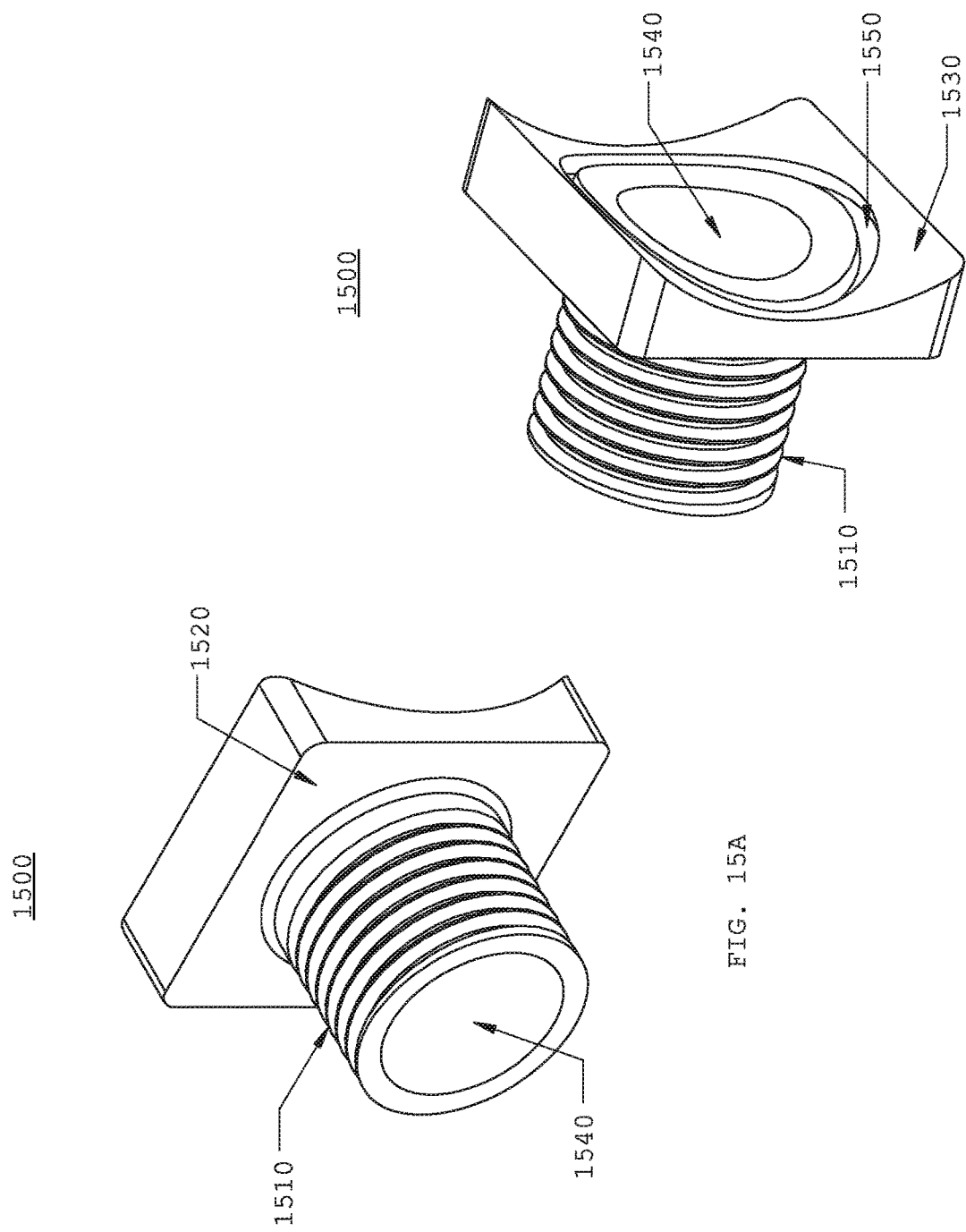

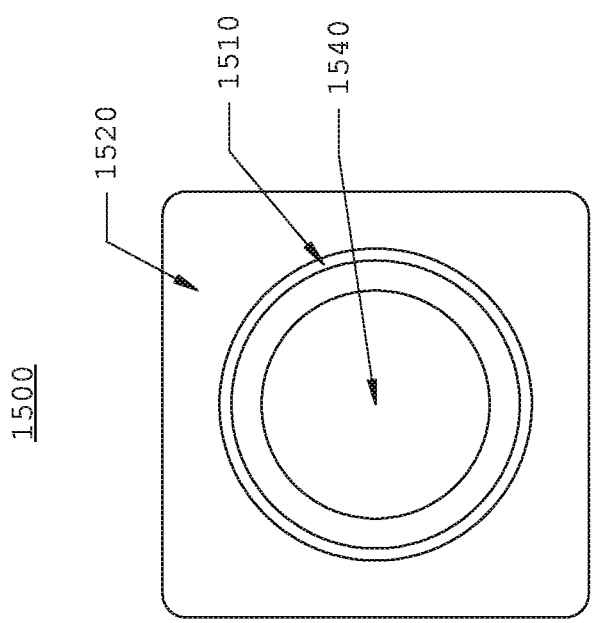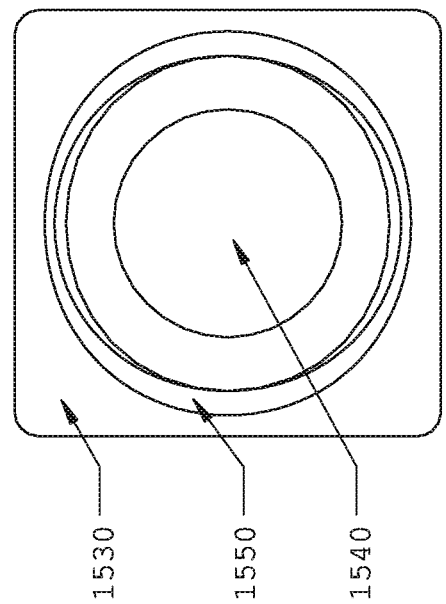

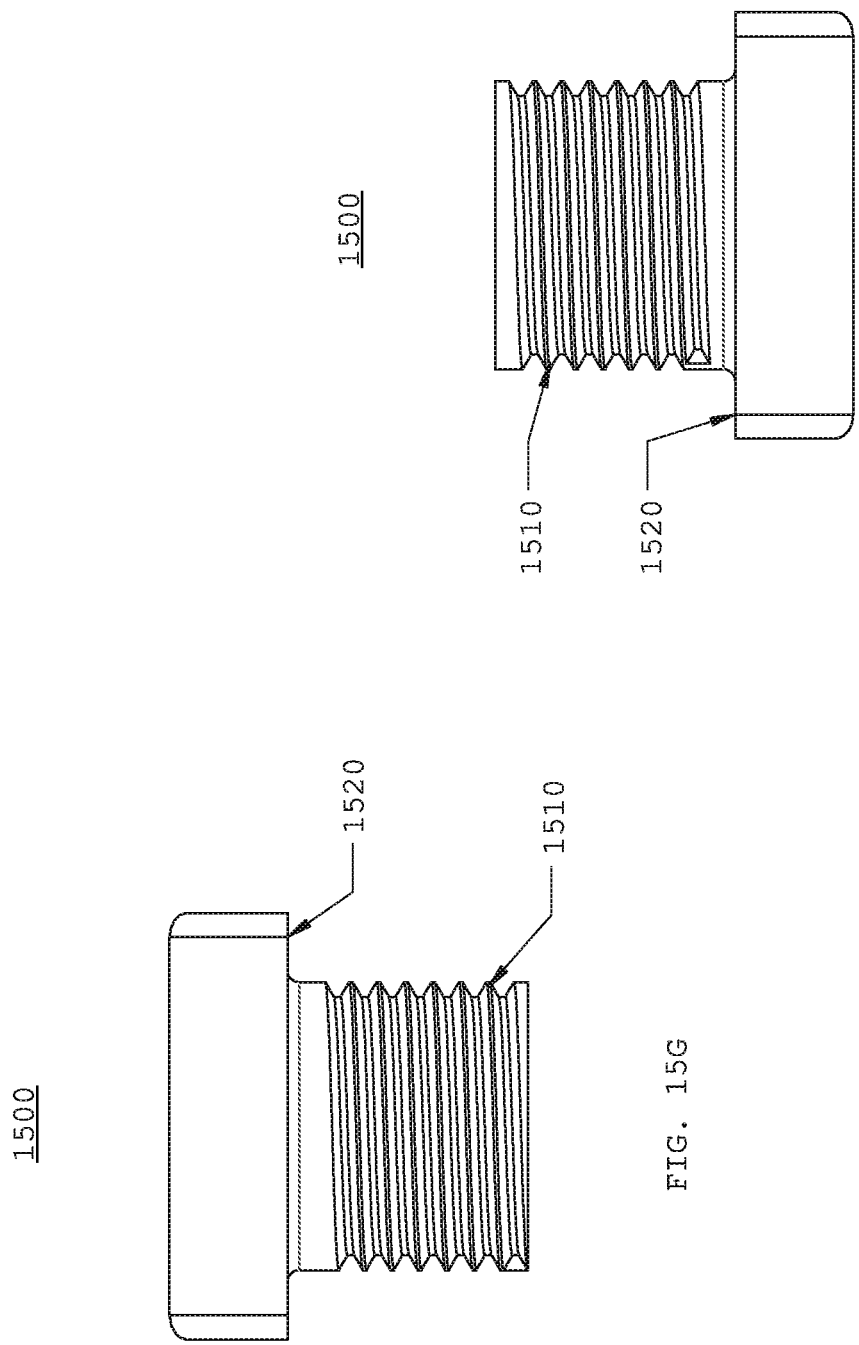

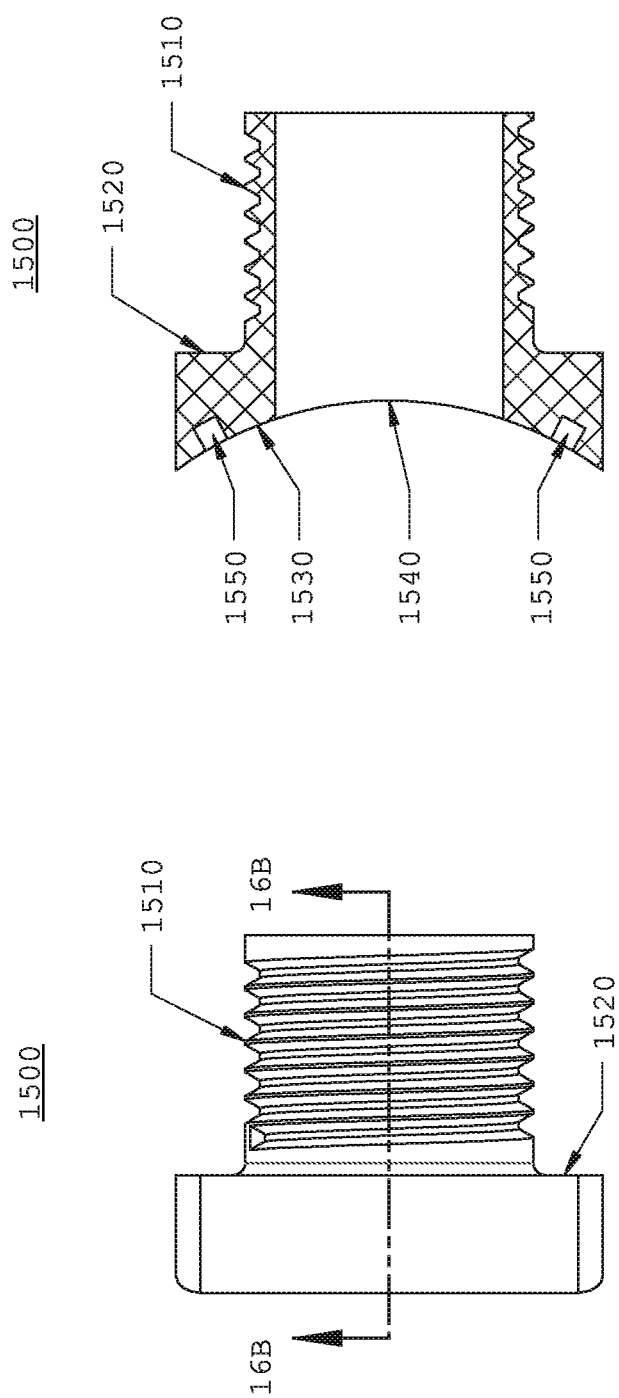

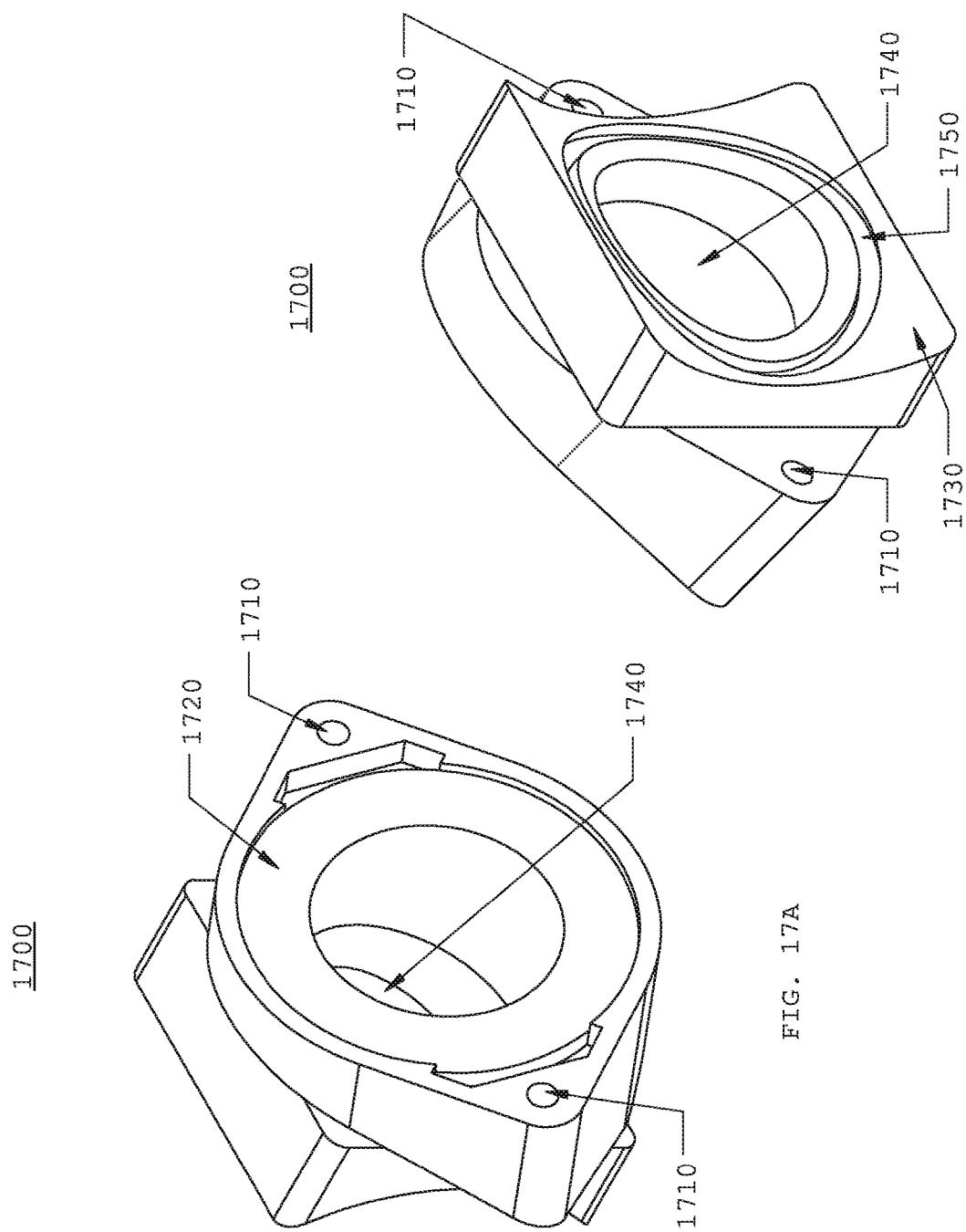

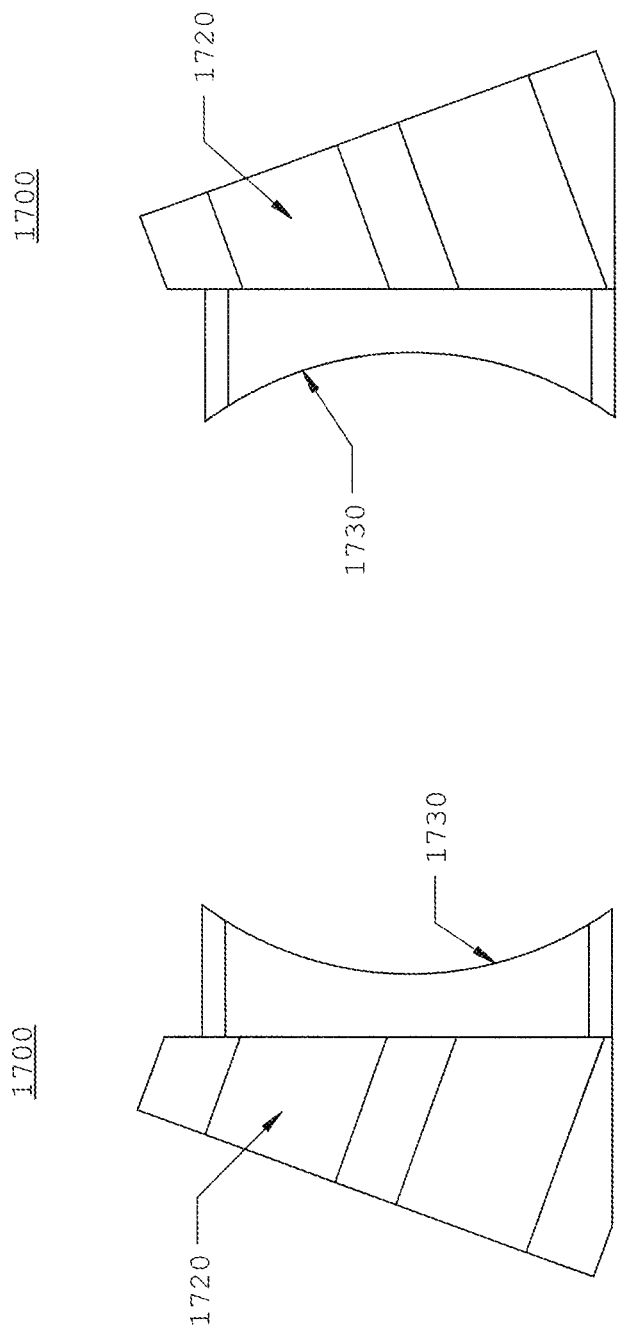

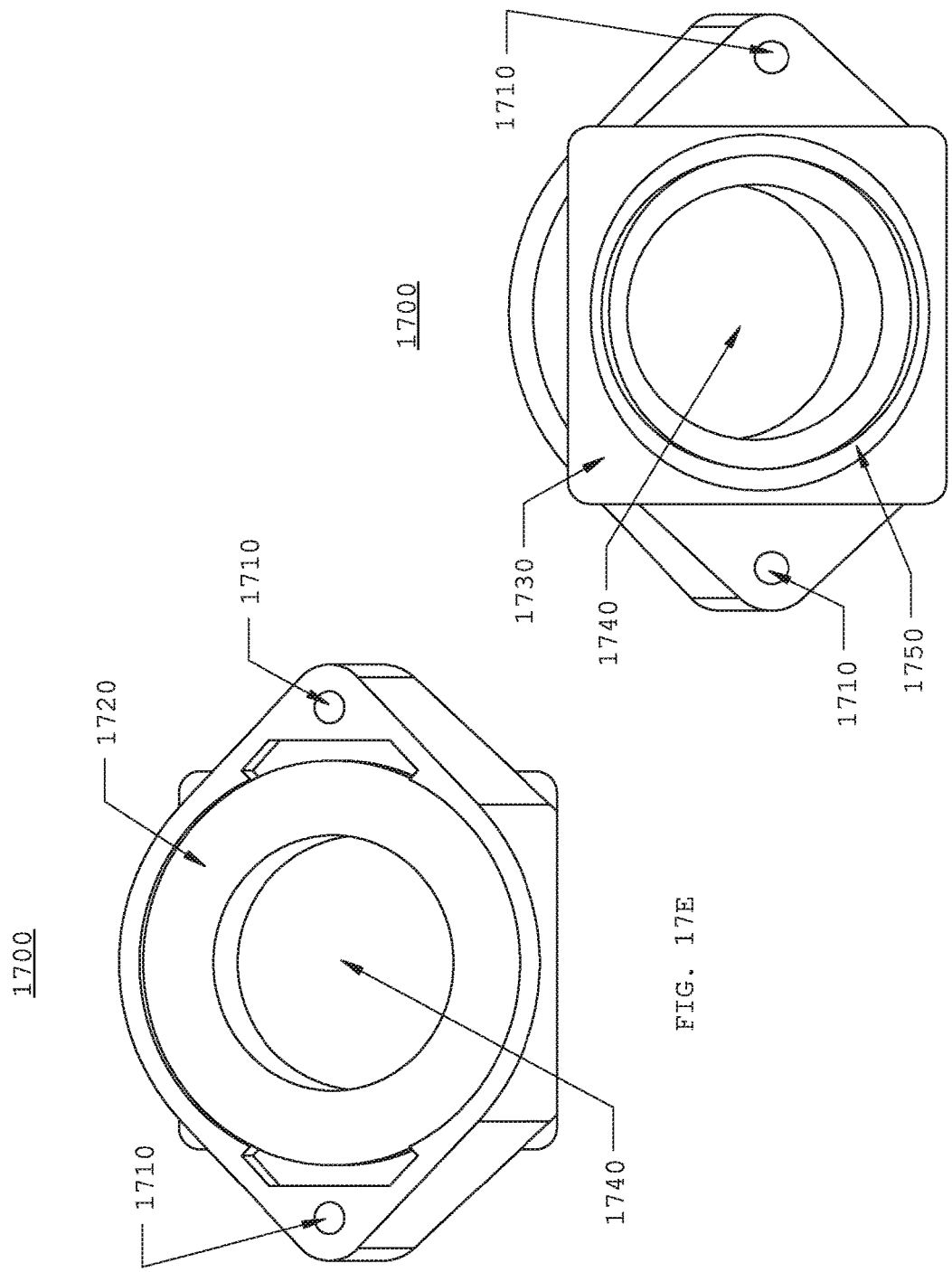

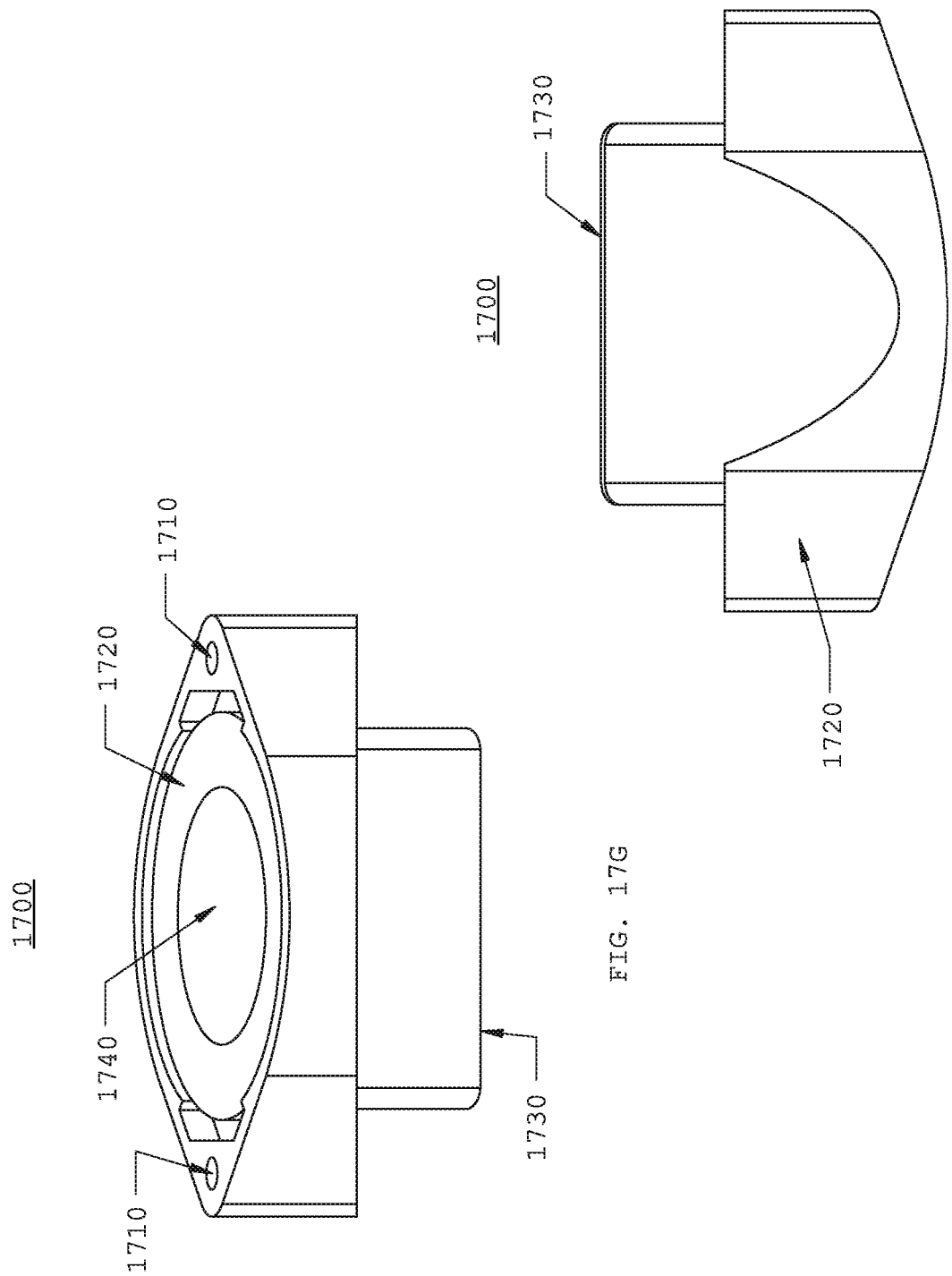

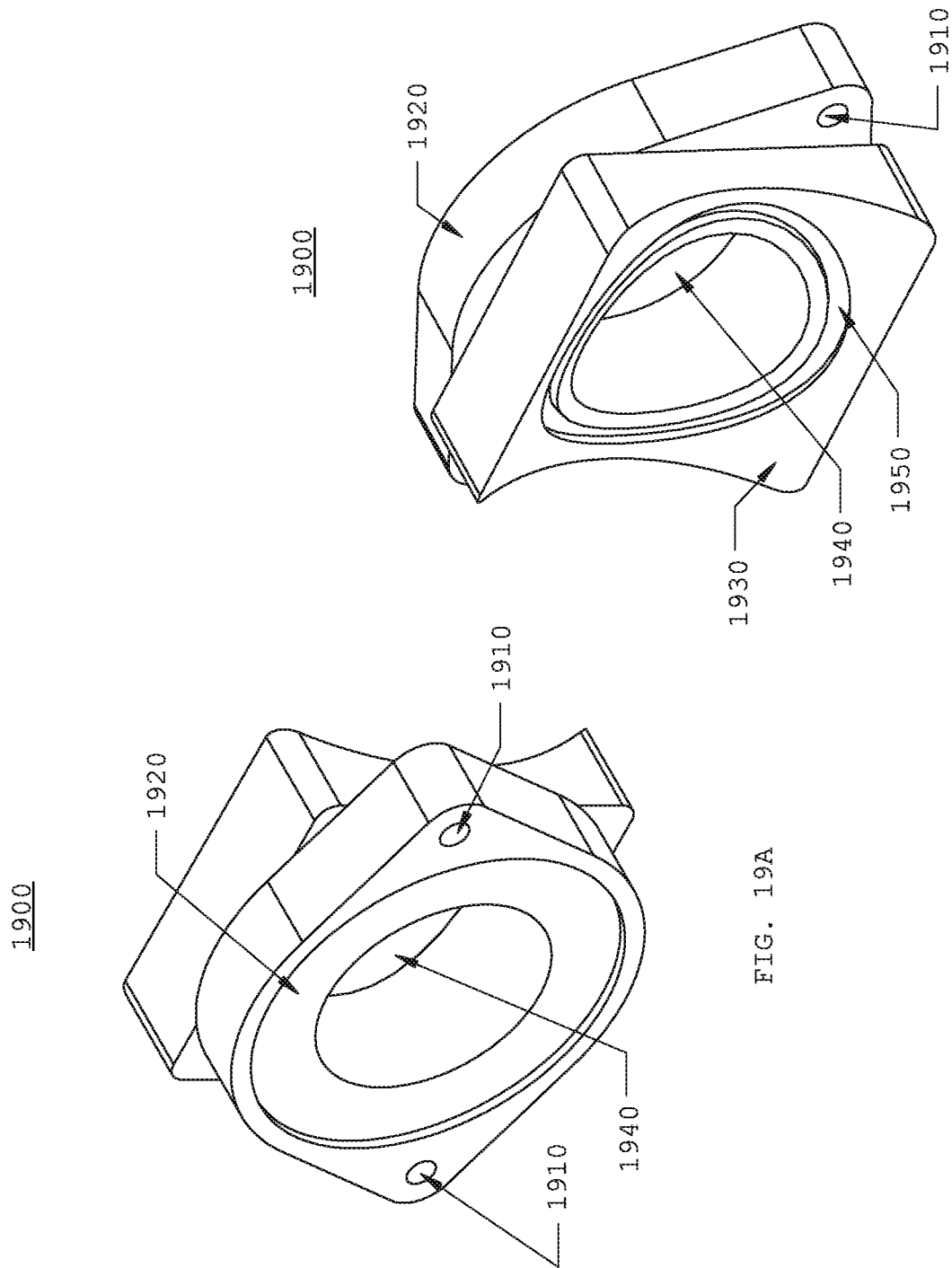

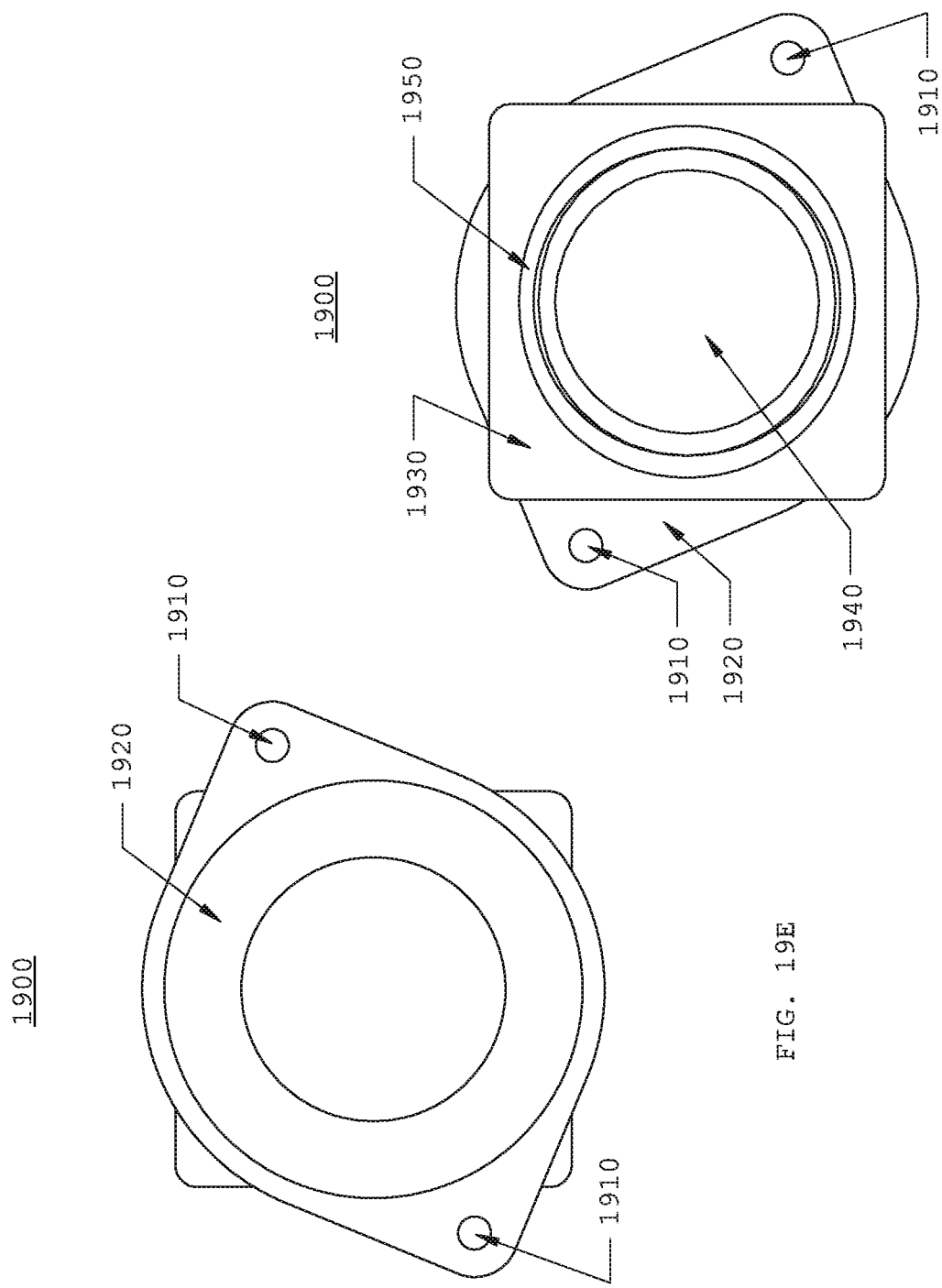

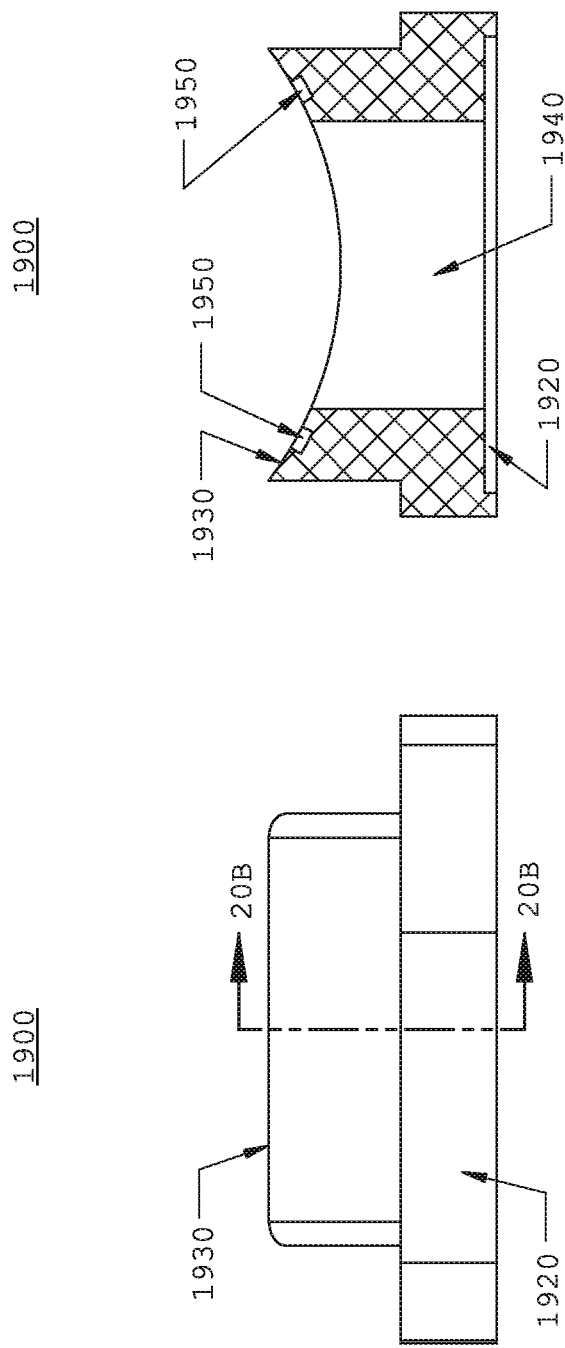

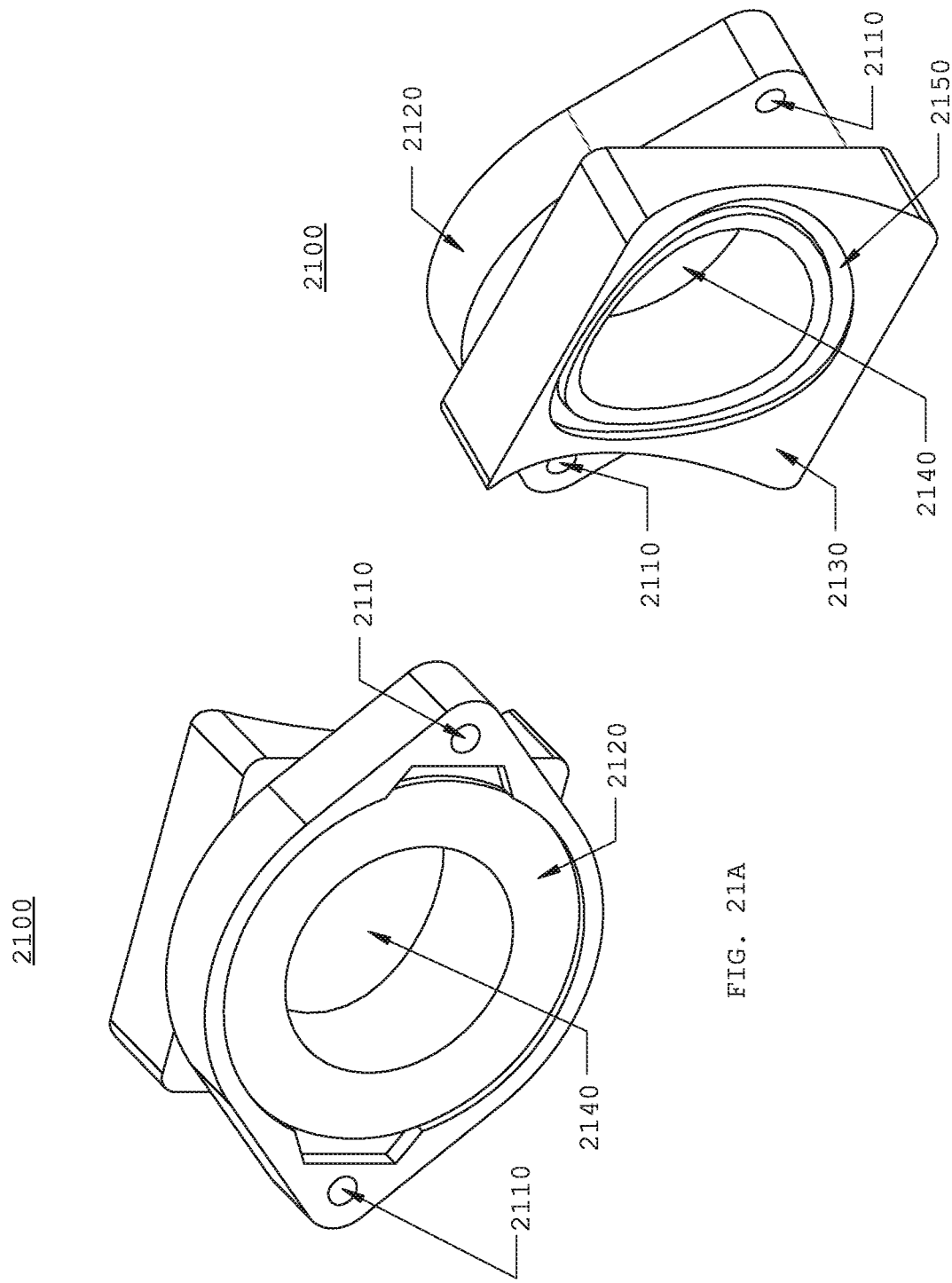

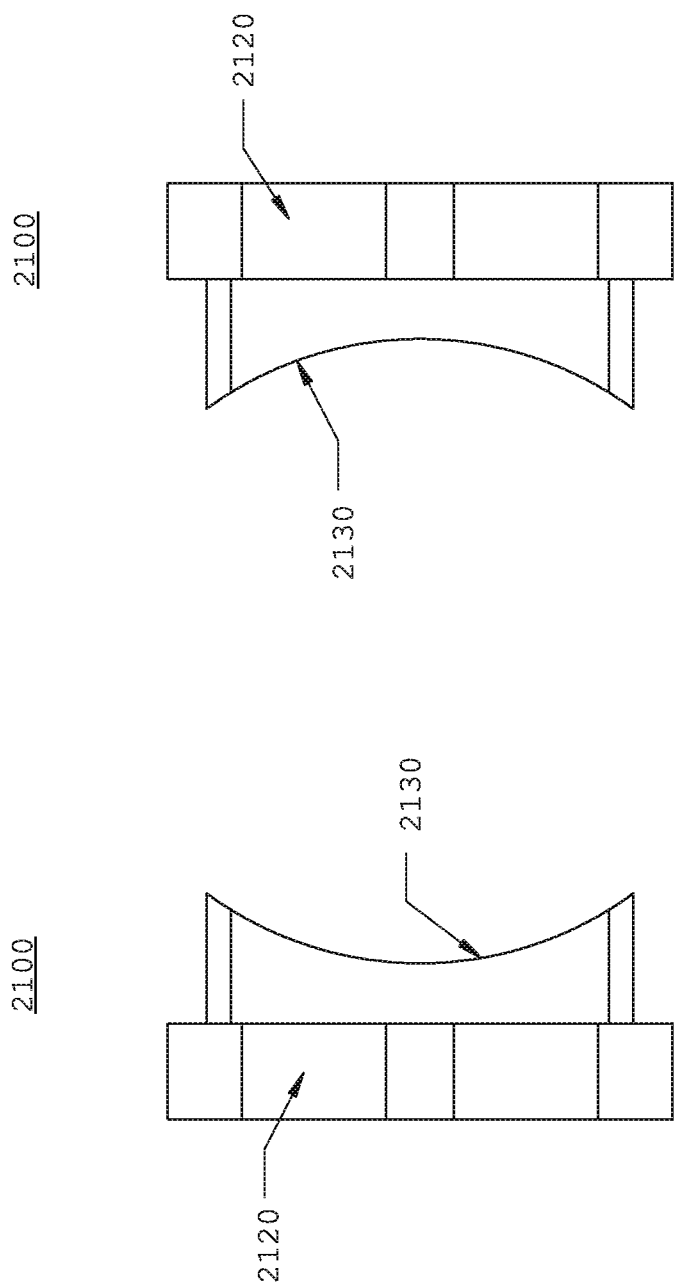

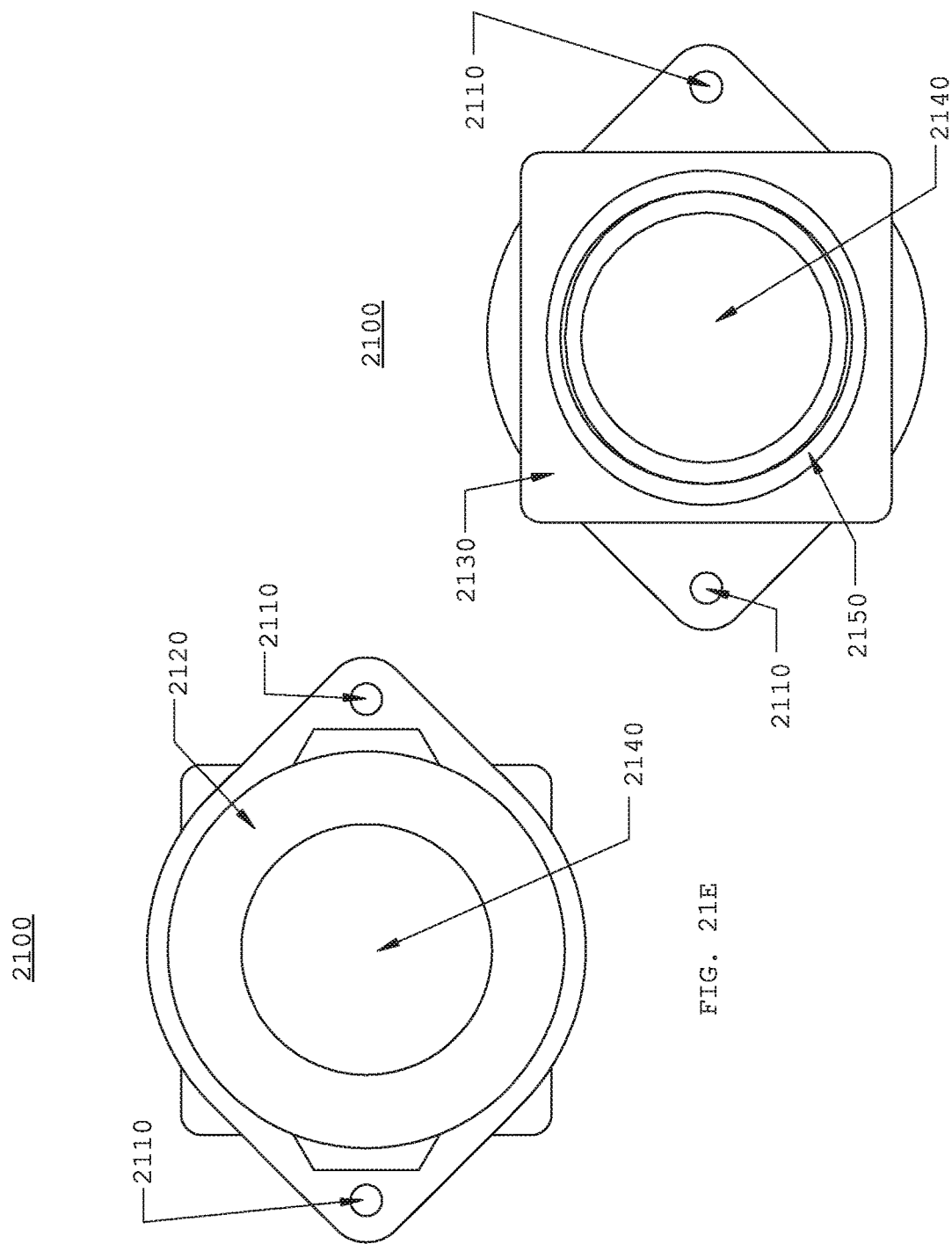

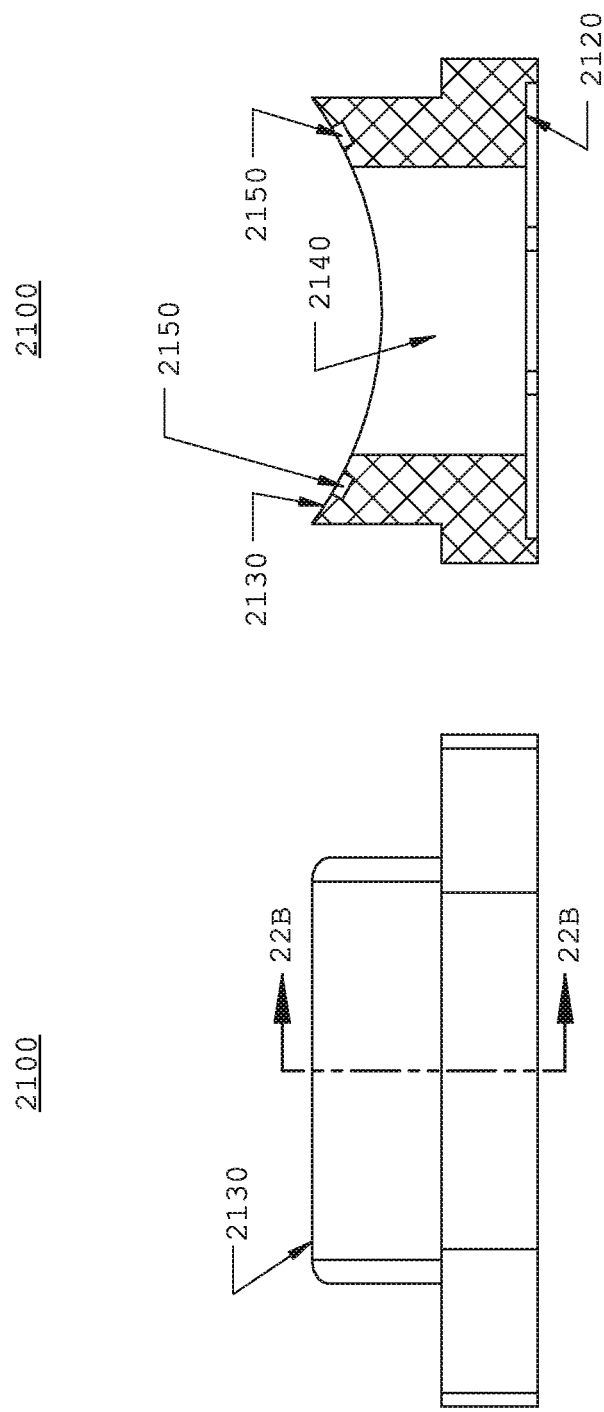

SERVICEABLE VALVE CAROUSEL SYSTEM

CROSS-REFERENCE TO RELATED APPLICATIONS

This application claims the benefit of, or priority to, U.S. Provisional Patent Application Ser. No. 62/832,196, filed on Apr. 10, 2019, which is hereby incorporated by reference in its entirety.

BACKGROUND OF THE INVENTION

Marine sanitation systems disposed on vessels, sometimes referred to as heads, typically include a pump system that controllably pumps water to drive waste through an outlet of the toilet bowl to a holding tank or discharge into the water. The head typically includes a consumable check valve, sometimes referred to as a joker valve, that is disposed inline with the outlet of the toilet bowl such that the waste intended to be discharged flows out of the toilet bowl and through the check valve under pressure to a connecting hose or pipe to the holding tank or discharge into the water. Consumable check valves, commonly used in marine sanitation systems, are typically composed of a flexible material with an outlet orifice that is configured to open under pressure and return to its normally closed state in the absence of pressure. Exemplars of consumable check valves include the Jabsco® black neoprene tricuspid valve, the Groco® black nitrile duckbill valve, and the Raritan® red nitrile duckbill valve. Consumable check valves are prone to failure from regular use, exposure to cleaning or winterizing agents, material issues, and ultimately deformation of the outlet orifice. The outlet orifice of a failed check valve typically gapes such that it remains at least partially open even in the absence of pressure from the pump system, resulting in the leakage of residual waste back into the toilet bowl and unpleasant odors. As such, the consumable check valve is typically replaced every few months and more frequently with heavy use.

BRIEF SUMMARY OF THE INVENTION

According to one aspect of one or more embodiments of the present invention, a serviceable valve carousel system includes a rotatable valve carousel, a valve carousel housing, a first port adapter, and a second port adapter. The rotatable valve carousel includes a substantially cylindrical portion, a valve cap receiver, a valve lumen, and a removable valve cap. The valve carousel housing includes a valve carousel receiver, a first port adapter receiver, a valve service port, and a second port adapter receiver.

According to one aspect of one or more embodiments of the present invention, a serviceable valve carousel system includes a rotatable valve carousel, a valve carousel housing, a first port adapter, and a second port adapter. The valve carousel housing includes a first port adapter receiver, a valve service port, and a second port adapter receiver. The rotatable valve carousel is disposed within the valve carousel housing and includes a valve lumen and a removable valve cap. The first port adapter is removably attached to the first port adapter receiver. The second port adapter is removably attached to the second port adapter receiver.

According to one aspect of one or more embodiments of the present invention, a serviceable valve carousel system includes a rotatable valve carousel and a valve carousel housing. The rotatable valve carousel includes a substantially cylindrical portion, a valve cap receiver, a valve lumen, and a removable valve cap. The valve carousel housing includes a valve carousel receiver, a first integrated port, a valve service port, and a second integrated port.

Other aspects of the present invention will be apparent from the following description and claims.

BRIEF DESCRIPTION OF THE DRAWINGS

FIGS. 2A, 2B, and 2C show a conventional marine sanitation system, a detailed view of a conventional check valve as part of the conventional marine sanitation system, and a maintenance operation of the conventional marine sanitation system respectively.

FIGS. 4A, 4B, 4C, 4D, 4E, 4F, 4G, and 4H show a front facing perspective view, a rear facing perspective view, a right-side elevation view, a left-side elevation view, a front elevation view, a rear elevation view, a top plan view, and a bottom plan view respectively of a serviceable valve carousel system in accordance with one or more embodiments of the present invention.

FIGS. 5A, 5B, 5C, and 5D show a top plan view of a cross-sectional cut line, a cross-sectional view of a first state corresponding to operative use, a top-plan view of a cross-sectional cut line, and a cross-sectional view of a second state corresponding to maintenance respectively of a serviceable valve carousel system in accordance with one or more embodiments of the present invention.

FIGS. 6A, 6B, 6C, and 6D show a marine sanitation system with a serviceable valve carousel system in a first state corresponding to operative use, a detailed view of a conventional check valve as part of the serviceable valve carousel system in the first state, a marine sanitation system with the serviceable valve carousel system in a second state corresponding to maintenance, and a detailed view of the conventional check valve as part of the serviceable valve carousel system in the second state respectively in accordance with one or more embodiments of the present invention.

FIGS. 7A, 7B, 7C, 7D, 7E, 7F, 7G, and 7H show a front facing perspective view, a rear facing perspective view, a right-side elevation view, a left-side elevation view, a front elevation view, a rear elevation view, a top plan view, and a bottom plan view respectively of a valve carousel housing of a serviceable valve carousel system in accordance with one or more embodiments of the present invention.

FIGS. 9A, 9B, 9C, 9D, 9E, 9F, 9G, and 9H show a front facing perspective view, a rear facing perspective view, a right-side elevation view, a left-side elevation view, a front elevation view, a rear elevation view, a top plan view, and a bottom plan view respectively of a valve carousel of a serviceable valve carousel system in accordance with one or more embodiments of the present invention.

FIGS. 10A and 10B show a top plan view of a cross-sectional cut line and a corresponding cross-sectional view of a valve carousel of a serviceable valve carousel system in accordance with one or more embodiments of the present invention.

FIGS. 11A, 11B, 11C, 11D, 11E, 11F, 11G, and 11H show a front facing perspective view, a rear facing perspective view, a right-side elevation view, a left-side elevation view, a front elevation view, a rear elevation view, a top plan view, and a bottom plan view respectively of a valve cap of a serviceable valve carousel system in accordance with one or more embodiments of the present invention.

FIGS. 12A and 12B show a front facing view of a cross-sectional cut line and a corresponding cross-sectional view of a valve cap of a serviceable valve carousel system in accordance with one or more embodiments of the present invention.

FIGS. 13A, 13B, 13C, 13D, 13E, 13F, 13G, and 13H show a front facing perspective view, a rear facing perspective view, a right-side elevation view, a left-side elevation view, a front elevation view, a rear elevation view, a top plan view, and a bottom plan view respectively of a hose connection-type port adapter of a serviceable valve carousel system in accordance with one or more embodiments of the present invention.

FIGS. 14A and 14B show a front facing view of a cross-sectional cut line and a cross-sectional view of a hose connection-type port adapter of a serviceable valve carousel system in accordance with one or more embodiments of the present invention.

FIGS. 15A, 15B, 15C, 15D, 15E, 15F, 15G, and 15H show a front facing perspective view, a rear facing perspective view, a right-side elevation view, a left-side elevation view, a front elevation view, a rear elevation view, a top plan view, and a bottom plan view respectively of a threaded connection-type port adapter of a serviceable valve carousel system in accordance with one or more embodiments of the present invention.

FIGS. 16A and 16B show a front facing view of a cross-sectional cut line and a cross-sectional view of a threaded connection-type port adapter of a serviceable valve carousel system in accordance with one or more embodiments of the present invention.

FIGS. 17A, 17B, 17C, 17D, 17E, 17F, 17G, and 17H show a front facing perspective view, a rear facing perspective view, a right-side elevation view, a left-side elevation view, a front elevation view, a rear elevation view, a top plan view, and a bottom plan view respectively of an angled flange connection-type port adapter of a serviceable valve carousel system in accordance with one or more embodiments of the present invention.

FIGS. 19A, 19B, 19C, 19D, 19E, 19F, 19G, and 19H show a front facing perspective view, a rear facing perspective view, a right-side elevation view, a left-side elevation view, a front elevation view, a rear elevation view, a top plan view, and a bottom plan view respectively of a rotated flange connection-type port adapter of a serviceable valve carousel system in accordance with one or more embodiments of the present invention.

FIGS. 20A and 20B show a top-plan cross-section cut line and a cross-sectional view of a rotated flange connection-type port adapter of a serviceable valve carousel system in accordance with one or more embodiments of the present invention.

FIGS. 21A, 21B, 21C, 21D, 21E, 21F, 21G, and 21H show a front facing perspective view, a rear facing perspective view, a right-side elevation view, a left-side elevation view, a front elevation view, a rear elevation view, a top plan view, and a bottom plan view respectively of a straight flange connection-type port adapter of a serviceable valve carousel system in accordance with one or more embodiments of the present invention.

FIGS. 22A and 22B show a top-plan cross-section cut line and a cross-sectional view of a straight flange connection-type port adapter of a serviceable valve carousel system in accordance with one or more embodiments of the present invention.

DETAILED DESCRIPTION OF THE INVENTION

Figure 1A:
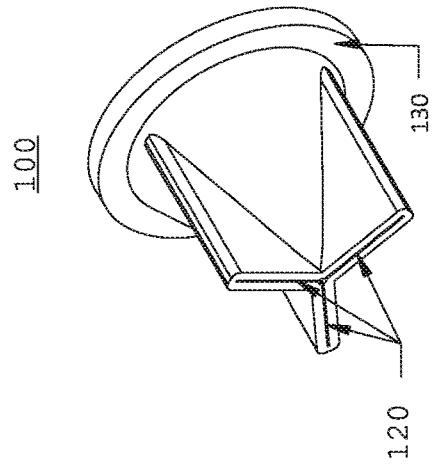
FIGS. 1A, 1B, 1C, and 1D show a front facing perspective view, a rear facing perspective view, a front elevation view, and a rear elevation view respectively of a conventional check valve commonly used in marine sanitation systems.

One or more embodiments of the present invention are described in detail with reference to the accompanying figures. For consistency, like elements in the various figures are denoted by like reference numerals. In the following detailed description of the present invention, specific details are set forth in order to provide a thorough understanding of the present invention. In other instances, well-known features to one of ordinary skill in the art are not described to avoid obscuring the description of the present invention.

Figure 1B:
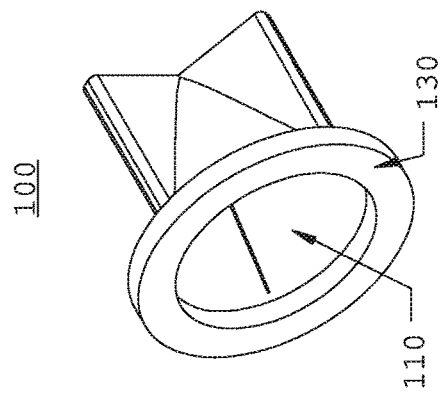
Figure 1C:
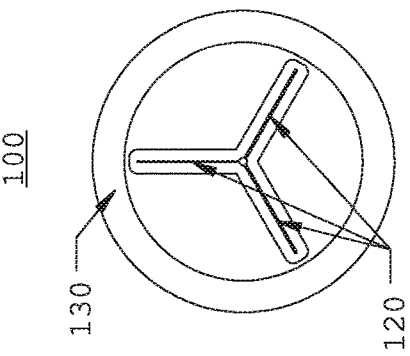
Figure 1D:
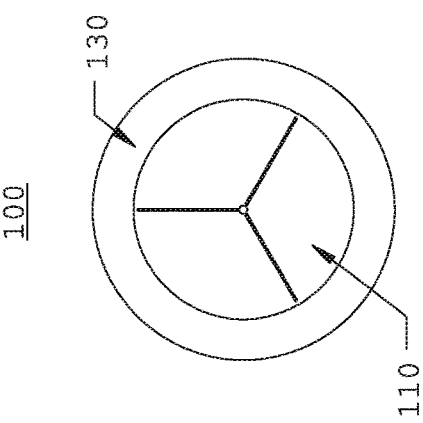

FIG. 1A shows a front facing perspective view a conventional check valve 100 used in conventional marine sanitation systems. Check valve 100 includes an inlet lumen 110 surrounded by a valve retention lip 130. In operative use, check valve 100 is disposed inline with an outlet of the toilet bowl (not shown) such that waste (not shown) intended to be discharged enters inlet lumen 110. Continuing, FIG. 1B shows an outlet orifice 120 of check valve 100. Upon application of sufficient pressure to the inlet lumen (e.g., 110), outlet lumen 120 opens allowing the waste (not shown) to be discharged therethrough. Continuing, FIG. 1C shows a front elevation view of check valve 100 showing fluid communication of inlet lumen 110 to outlet orifice 120, depicted in the closed state as it would appear prior to the application of pressure (or failing deformation). Continuing, FIG. 1D shows a rear elevation view of check valve 100 showing outlet orifice 120 in the closed state. When sufficient pressure is applied to inlet lumen 110, outlet orifice 120 opens such that waste (not shown) may be disposed therethrough. When the opening pressure is removed, outlet orifice 120 typically closes, as depicted, such that there is no fluid communication between the inlet lumen 110 and the outlet orifice 120. However, when check valve 100 fails, outlet lumen 120 typically gapes (not shown) remaining at least partially open in the absence of pressure. In the embodiment depicted in FIGS. 1A through 1D, a tricuspid-type check valve 100 is shown. One of ordinary skill in the art will recognize that duckbill-type (not shown) check valves 100 that include an outlet orifice that resembles a duckbill are commonly used, as well as other sizes, shapes, and configurations may be used as an inline check valve. As such, for the purposes of the disclosure herein, the term check valve shall apply to tricuspid-type, duckbill-type, or any other consumable check valve suitable for use in marine sanitation systems as an inline valve.

FIG. 2A shows a conventional marine sanitation system 200 typically found on a marine vessel 205. Sanitation system 200 includes a toilet bowl 215 and a pump system 220 configured to discharge waste (not shown) from toilet bowl 215 to discharge port 245. Specifically, pump system 220 controllably pumps water (not shown) received from a water inlet 225 into an inlet vented loop 230 that is fluidly connected to toilet bowl 215. The fluid pressure provided by pump system 220 causes waste (not shown) in toilet bowl 215 to be conveyed through a conventional inline valve system 235 to on-board storage (not shown) or discharge 245 into the water 210. While a manual pump system 220 is depicted, one of ordinary skill in the art will recognize that electric pump systems (not shown) and vacuum pump systems (not shown) operate in a similar manner with respect to the operation, removal, and replacement of worn check valves (e.g., 100).

Continuing, FIG. 2B shows a detail view of conventional inline valve system 235 that includes a flanged inlet connector 250 in fluid communication with an outlet of the toilet bowl (e.g., 215), a valve housing 260 that includes a conventional check valve 100 disposed therein and oriented inline for fluid flow therethrough, and an outlet connector 255 in fluid communication with discharge port 245. When the pump system (e.g., 220) provides sufficient pressure to the inlet lumen (e.g., 110) of check valve 100, the outlet lumen (e.g., 120) opens and waste (not shown) is discharged therethrough. Over time, wear from regular use, exposure to cleaning or winterizing agents, material failure, or deformation, cause check valve 100 to fail, resulting in an outlet orifice (e.g., 120) that gapes, remaining at least partially open even in the absence of pressure from the pump system (e.g., 220). Residual waste (not shown) may leak back into the toilet bowl (e.g., 215) and unpleasant odors may permeate the head 200 space and vessel 205. While consumable check valves 100 used in marine sanitation systems (e.g., 200) are relatively inexpensive components, it is the process by which they are removed and replaced that is difficult, time consuming, and results in exposure to raw or untreated sewage that must be handled in an unsanitary manner.

Figure 2C:
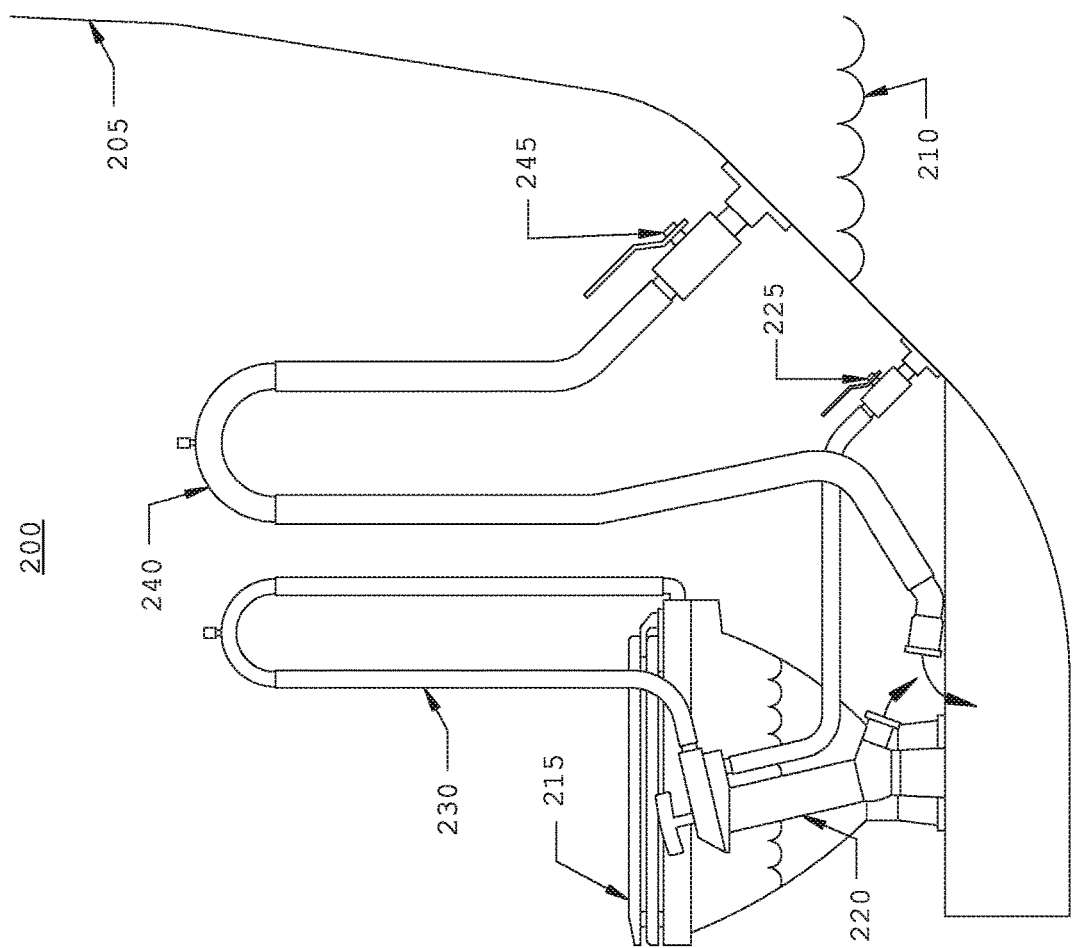

Continuing, FIG. 2C shows a maintenance operation of conventional marine sanitation system 200. Check valves (e.g., 100) are typically replaced on a fixed maintenance schedule or upon failure. Because of the restricted amount of space in the head 200 space, the operation can be difficult and time-consuming. To gain access to the check valve (e.g., 100), a flanged inlet connector 250 must be detached from pump system 220 such that the interior of valve housing 260 is accessible. Typically, a plurality of screws or other fasteners (not shown) must be removed to detach flanged inlet connector 250 in an operation that is difficult to perform in the limited head 200 space. Outlet connector 255 remains fluidly connected to outlet vented loop 240 or other hoses or piping that fluidly connect to discharge port 245. Residual raw or untreated sewage, sometimes referred to black water, may remain downstream of the check valve (e.g., 100) in portions of outlet vented loop 240 and sometimes upstream in toilet bowl 215 or pump system 220. As such, when flanged inlet connector 260 is detached, any residual waste (not shown) remaining in the system, either upstream or downstream of the check valve (e.g., 100), may leak out exposing the person performing the maintenance to black water and unpleasant odors. Manufacturers of conventional marine sanitation systems 200 recommend that a pan, bowl, or other catch (not shown) be placed under valve housing 260 prior to removing and replacing the worn check valve (e.g., 100) in anticipation of the undesirable leakage of black water. However, there is limited space in head 200 spaces for such catches and little room to even manipulate the tools necessary to detach valve housing 260. As such, current methods and systems require the use of tools and a catch to perform maintenance operations in a space-limited area that results in the undesirable discharge of raw or untreated sewage in the head 200 space or potentially in the bilge (not shown) and unpleasant odors that permeate the vessel 205. In addition, the residual waste (not shown) captured in the catch must be handled and disposed of.

Accordingly, in one or more embodiments of the present invention, a serviceable valve carousel system provides for the removal and replacement of a worn check valve without the undesirable discharge of raw or untreated sewage, the leakage of offensive odors, and does not require any tools or catches. Advantageously, the serviceable valve carousel system facilitates the removal and replacement of worn check valves in a simple tool-less operation that takes mere seconds to perform and does not require the handling of raw or untreated sewage.

Figure 3:
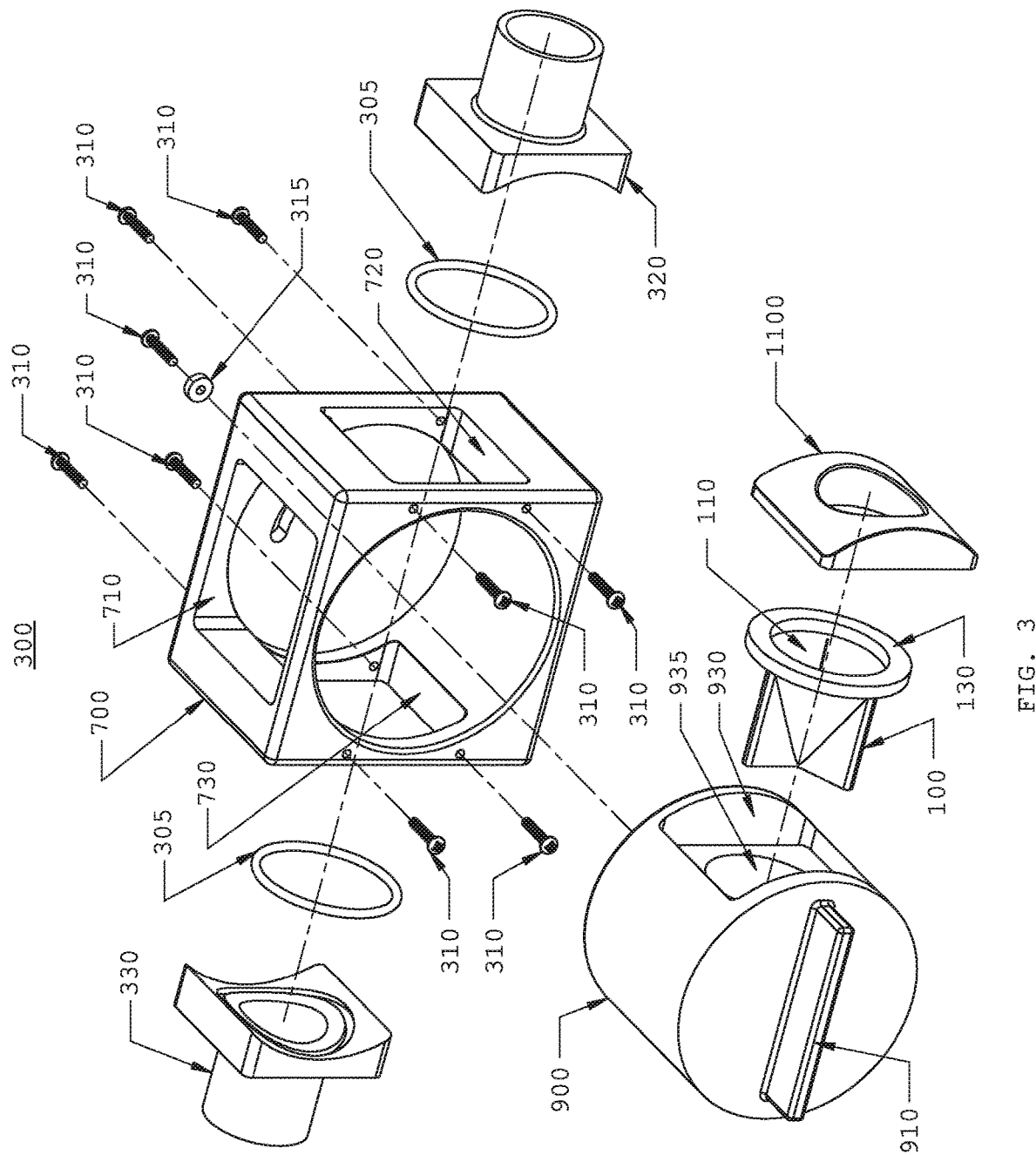
FIG. 3 shows a front facing exploded view of a serviceable valve carousel system in accordance with one or more embodiments of the present invention.

FIG. 3 shows a front facing exploded view of a serviceable valve carousel system 300 in accordance with one or more embodiments of the present invention. Serviceable valve carousel system 300 may include a valve carousel 900 configured to rotatably disposed within a valve carousel housing 700. A rotation handle 910 may be used to rotate valve carousel 900 between a first state that allows fluid communication between a first port adapter 320 and a second port adapter 330 through a check valve 100 under fluid pressure and a second state that allows check valve 100 to be easily removed and replaced via valve service port 710 while maintaining the sewage connection. In certain embodiments, valve carousel housing 700 may include a first port adapter receiver 720 that receives a first port adapter 320 and a second port adapter receiver 730 that receives a second port adapter 330. A plurality of screws 310 or other fasteners (not shown) may be used to secure first port adapter 320 and second port adapter 330 to valve carousel housing 700. First port adapter 320 and second port adapter 330 may each include one or more O-ring receivers (e.g., 1350) that form a seal with valve carousel 900. While hose connection-type port adapters 320, 330 are depicted, one or more of hose, threaded, angled flange, rotated flange, straight flange, and any other suitable connection type may be used to facilitate connectivity with different types, kinds, and configurations of marine sanitation systems (e.g., 200). In operative use, first port adapter 320 may be connected to the discharge outlet of the toilet (e.g., 215) and second port adapter 330 may be connected to the outlet vented loop (e.g., 240) or other discharge hose or piping (not shown). In other embodiments (not shown), valve carousel housing 700 may integrate one or more of first port adapter 320 and second port adapter 330 into a unibody housing 700.

FIG. 4A shows a front facing perspective view of a serviceable valve carousel system 300 in accordance with one or more embodiments of the present invention. Serviceable valve carousel system 300 is depicted in the second state corresponding to a maintenance configuration such that valve service port 710 provides access to valve cap 1100 and check valve 100 disposed thereunder. In this second state, the fluid communication between first port adapter 320 and second port adapter 330 may be suspended such that the worn check valve 100 may be easily removed and replaced. Continuing, FIG. 4B shows a rear-racing perspective view of the serviceable valve carousel system 300 in accordance with one or more embodiments of the present invention. Valve carousel 900 may include a guide pin 920 that travels within a guide pin slot 720 of valve carousel housing 700 to restrict the rotation of valve carousel 900 within valve carousel housing 700. In the figure, guide pin 920 is shown in a position within guide pin slot 720 corresponding to the second state corresponding to the maintenance configuration. If the rotation handle (e.g., 910) is rotated such that guide pin 920 travels to the opposing end of guide pin slot 720, serviceable valve carousel system 300 transitions to the first state (not shown) corresponding to operative use, where the check valve (e.g., 100) may be opened under pressure to establish fluid connectivity between first port adapter 320 and second port adapter 330. Continuing, FIG. 4C shows a right-side elevation view of the serviceable valve carousel system 300 in the first state corresponding to operative use in accordance with one or more embodiments of the present invention. First port adapter 320 may include a lumen that is fluidly connected to the inlet lumen 110 of check valve 100 disposed therein.

Continuing, FIG. 4D shows a left-side elevation view of the serviceable valve carousel system 300 in the first state corresponding to operative use in accordance with one or more embodiments of the present invention. Similarly, second port adapter 330 may include a lumen that is fluidly connected to the outlet lumen 120 of check valve 100 disposed therein. When sufficient pressure is applied, the outlet lumen 120 of check valve 100 is open and first port adapter 320 may fluidly communicate with second port adapter 330 through check vale 100. Continuing, FIG. 4E shows a front elevation view of the serviceable valve carousel system 300 in the first state corresponding to operative use in accordance with one or more embodiments of the present invention. Rotation handle 910 may allow a person to rotate valve carousel 900 within valve carousel housing 700 easily using hand power without the use of tools. One of ordinary skill in the art will recognize that the shape, size, and configuration of rotation handle 910 may vary based on an application or design in accordance with one or more embodiments of the present invention. Continuing, FIG. 4F shows a rear elevation view of the serviceable valve carousel system 300 in the first state corresponding to operative use in accordance with one or more embodiments of the present invention. A screw 310 and a washer 315 may be used to secure valve carousel 900 to valve carousel housing 700. One of ordinary skill in the art will recognize that other fasteners (not shown) may be used in accordance with one or more embodiments of the present invention. Continuing, FIG. 4G shows a top plan view of the serviceable valve carousel system 300 in the first state corresponding to operative use in accordance with one or more embodiments of the present invention. Valve carousel housing 700 may include a valve service port 710 that provides access to valve carousel 900. When in the second state corresponding to maintenance (not shown), valve service port 710 is the aperture through which access to the valve cap (not shown) and the check valve (not shown) is provided allowing for removal and replacement without tools. Continuing, FIG. 4H shows a bottom plan view of the serviceable valve carousel system 300 in accordance with one or more embodiments of the present invention.

FIG. 5A shows a top plan view of a cross-sectional cut line of a serviceable valve carousel system 300 in a first state corresponding to operative use in accordance with one or more embodiments of the present invention. Continuing, FIG. 5B shows the corresponding cross-sectional view of the serviceable valve carousel system 300. As shown, first port adapter 320 may include an O-ring 305 or other type or kind of sealing element (not shown) that forms a fluid-tight seal with valve cap 1100. Valve cap 1100 may include a substantially radiused surface compatible with the substantially radiused surface of the substantially cylindrical portion 905 that facilitates rotation of valve carousel 900 within valve carousel housing 700. In operative use, valve cap 1100 serves as a compression retainer for the check valve 100 disposed thereunder. For the purpose of this disclosure, the phrase substantially radiused means a curved surface that may or may not be perfectly curved or rounded. Similarly, for purpose of this disclosure, the phrase compatible with means having a similar radius, curvature, or roundness. Similarly, second port adapter 330 may include an O-ring 305 or other type or kind of sealing element (not shown) that forms a fluid-tight seal with a radiused surface of valve carousel 900. As such, in this first state corresponding to operative use, when sufficient pressure is provided, there is fluid communication between first port adapter 320 and second port adapter 330 through check valve 100 at least partially disposed within a lumen of valve carousel 900.

Continuing, FIG. 5C shows a top plan view of a cross-sectional cut line of a serviceable valve carousel system 300 in a second state corresponding to maintenance operations in accordance with one or more embodiments of the present invention. Continuing, FIG. 5D shows the corresponding cross-sectional view of the serviceable valve carousel system 300. As shown, first port adapter 320 may include one or more O-rings 305 or other type or kind of sealing elements (not shown) that form a fluid-tight seal with a radiused surface of valve carousel 900. Similarly, second port adapter 330 may include one or more O-rings 305 or other type or kind of sealing elements (not shown) that form a seal with a radiused surface of valve carousel 900. First port adapter 320 may remain fluidly connected to a discharge outlet of the toilet (e.g., 215) and the second port adapter 330 may remain fluidly connected to an outlet vented loop (e.g., 240) or other hose or pipe (not shown), while there is no fluid communication between first port adapter 320 and second port adapter 330. Because of the fluid-tight seals formed by O-rings 305, there is no sewage leakage in this fluidly disconnected maintenance state. Valve service port 710 may provide access to valve cap 1100, which may be removed to provide access to the check valve 100 disposed thereunder. Valve service port 710 may have a size, shape, and a configuration that allows valve cap 100 to be removed therethrough. One of ordinary skill in the art will recognize that the size, shape, and configuration of valve service port 710 may vary based on an application or design in accordance with one or more embodiments of the present invention.

Figure 6B:
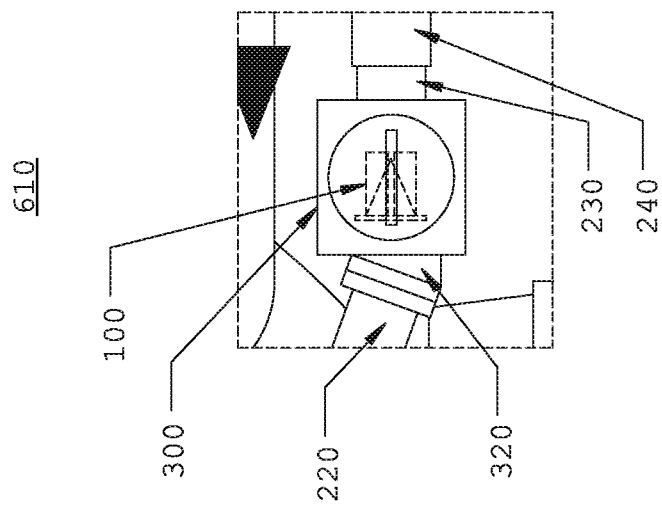
Figure 6A:
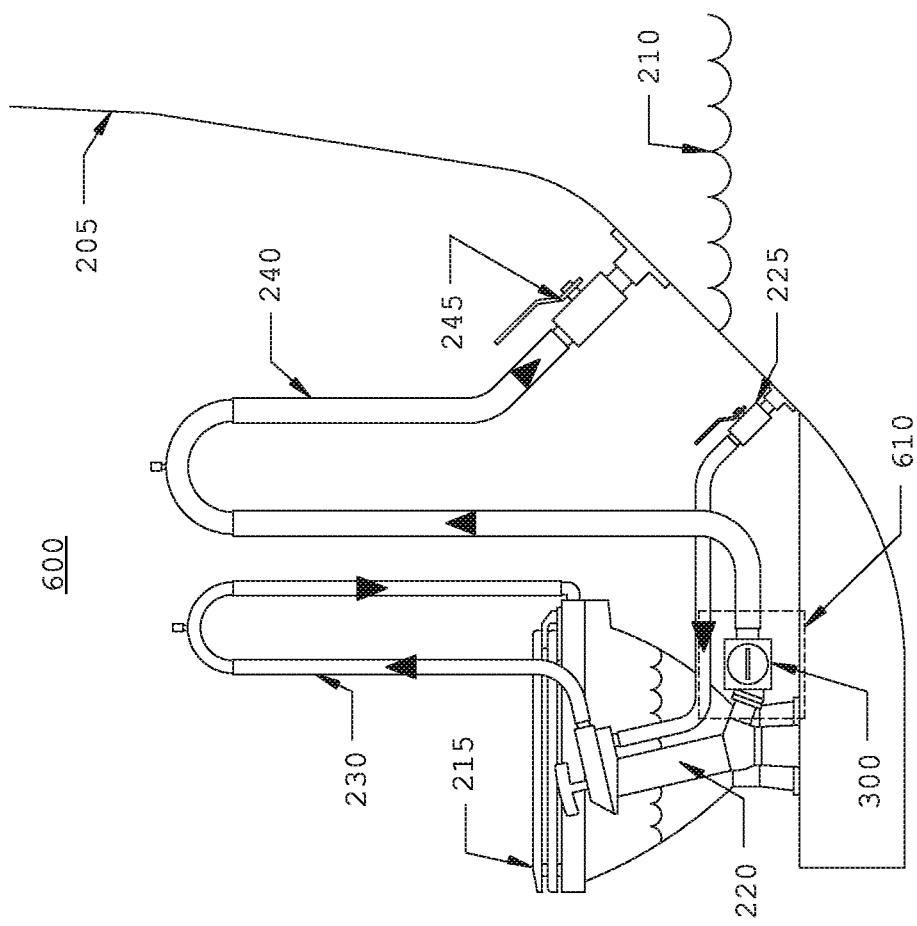

FIG. 6A shows a marine sanitation system 600 with a serviceable valve carousel system 300 in a first state corresponding to operative use in accordance with one or more embodiments of the present invention. Serviceable valve carousel system 300 may be used in place of the conventional inline valve system (e.g., 235) commonly used in conventional marine sanitation systems (e.g., 200) without modification. As such, serviceable valve carousel system 300 may be installed on existing installations of marine sanitation systems (e.g., 200) as well as new installations. In the first state corresponding to operative use, water inlet 225 provides water to pump system 220. When engaged, pump system 220 provides water under pressure to toilet 215 via inlet vented loop 230 that drives waste (not shown) disposed in toilet 215 through serviceable valve carousel system 300 towards outlet vented loop 240 for discharge 245. Continuing, FIG. 6B shows a detailed view of a conventional check valve 100 as part of the serviceable valve carousel system 300 in accordance with one or more embodiments of the present invention.

When a worn check valve 100 requires replacement, serviceable valve carousel system 300 may be transitioned to a second state corresponding to maintenance operation without the use of tools while maintaining the sewage connection without leakage or exposure to residual waste. Continuing, FIG. 6C shows the marine sanitation system 600 with the serviceable valve carousel system 300 in a second state corresponding to maintenance operation in accordance with one or more embodiments of the present invention. In the second state, the fluid connectivity between toilet 215 and outlet vented loop 240 is suspended. Continuing, FIG. 6D shows a detailed view of the conventional check valve as part of the serviceable valve carousel system 300 in accordance with one or more embodiments of the present invention. While the fluid-tight seal between toilet 215 and serviceable valve carousel system 300 as well as the fluid-tight seal between serviceable valve carousel system 300 and outlet vented loop 240 remain intact, check valve 100 is effectively disconnected from the path of fluid communication and may be removed and replaced via the valve service port 710 of valve carousel housing 700. The user may remove valve cap 1100 through valve service port 710 and easily remove and replace check valve 100 without the use of tools or a catch using only hand power. Once replaced, the user may simply rotate valve carousel 900 back to the first state returning the serviceable valve carousel system 300 back to operative use.

Figure 7D:
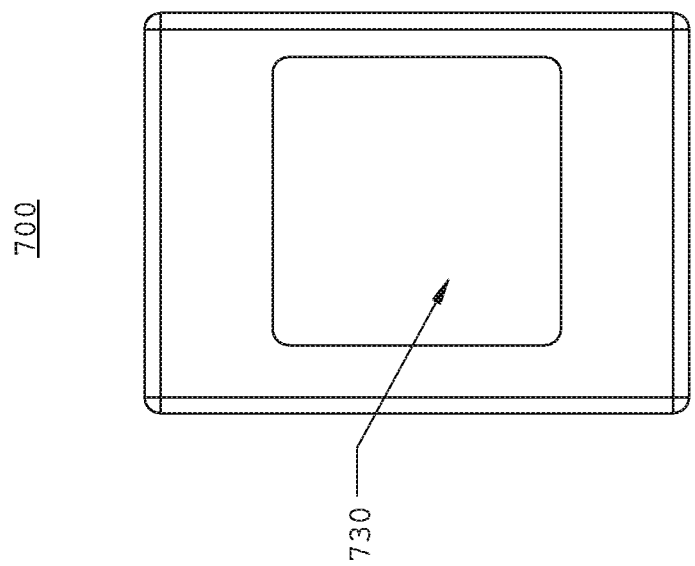
Figure 7C:
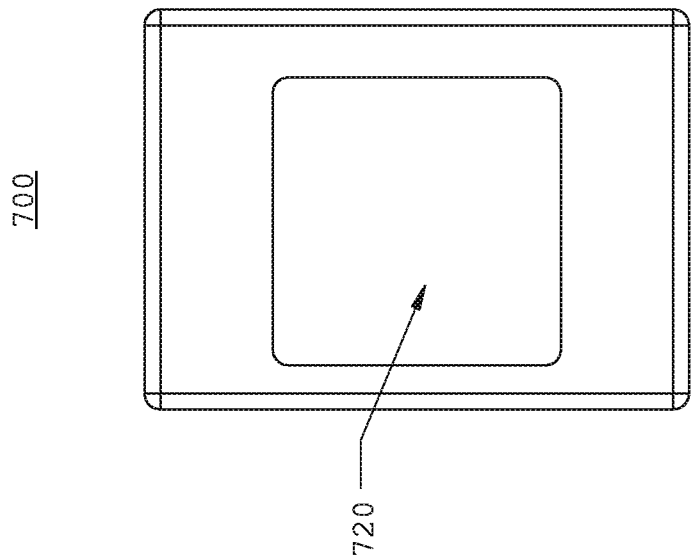
Figure 7H:
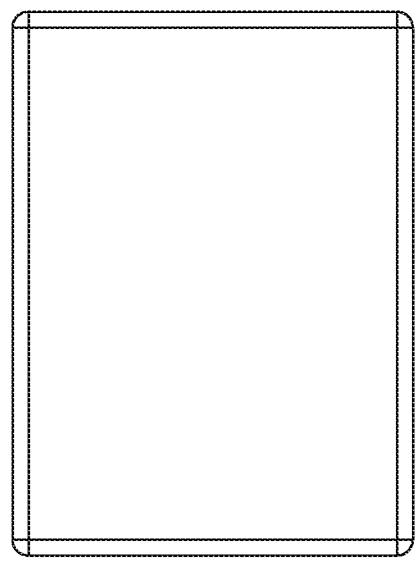
Figure 7G:
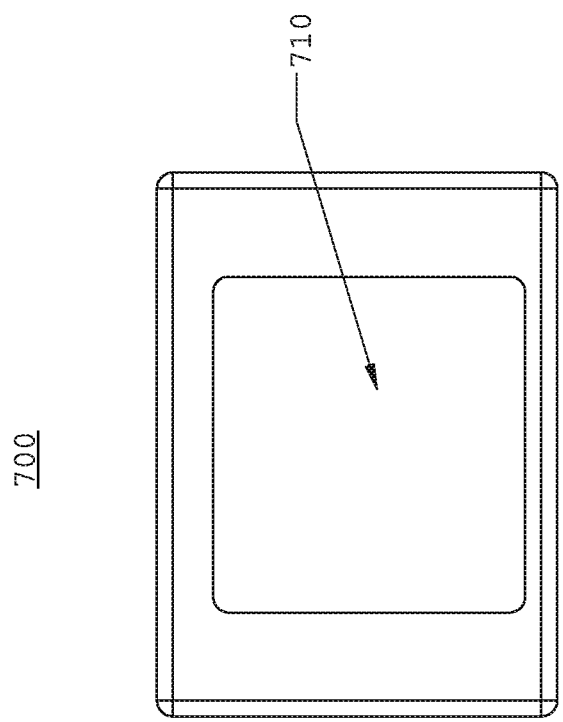

FIG. 7A shows a front facing perspective view of a valve carousel housing 700 of a serviceable valve carousel system (e.g., 300) in accordance with one or more embodiments of the present invention. Valve carousel housing 700 may include a valve service port 710, a first port adapter receiver 720, a second port adapter receiver 730, and a valve carousel receiver 740. Continuing, FIG. 7B shows a rear facing perspective view of the valve carousel housing 700 in accordance with one or more embodiments of the present invention. Valve carousel housing 700 may include a guide pin slot 715 and a mounting post receiver 750. Guide pin slot 715 may receive a guide pin (e.g., 920) and restrict rotation of the valve carousel (e.g., 900) between the first state and the second state within valve carousel housing 700. One of ordinary skill in the art will recognize that the size, shape, and configuration of guide pin slot 715 may vary based on an application or design in accordance with one or more embodiments of the present invention. Mounting post receiver 750 may receive a mounting post (e.g., 950) used to secure valve carousel (e.g., 900) to valve carousel housing 700. Continuing, FIG. 7C shows right-side elevation view of the valve carousel housing 700 in accordance with one or more embodiments of the present invention. First port adapter receiver 720 may be a cutout formed in valve carousel housing 700 that has a size, shape, and configuration to receive a first port adapter (not shown). Continuing, FIG. 7D shows left-side elevation view of the valve carousel housing 700 in accordance with one or more embodiments of the present invention. Second port adapter receiver 730 may be a cutout formed in valve carousel housing 700 that has a size, shape, and configuration to receive a second port adapter (not shown). Continuing, FIG. 7E shows a front elevation view of the valve carousel housing 700 in accordance with one or more embodiments of the present invention. Valve carousel housing 700 may include a valve carousel receiver 740 having a size, shape, and configuration to receive a valve carousel (e.g., 900). A plurality of mounting holes 760 may be used to secure the first and second port adapters (e.g., 320, 330) to valve carousel housing 700. Continuing, FIG. 7F shows a rear elevation view of valve carousel housing 700 in accordance with one or more embodiments of the present invention. Continuing FIG. 7G shows a top plan view of the valve carousel housing 700 in accordance with one or more embodiments of the present invention. Valve carousel housing 700 may include a valve service port 710 having a size, shape, and configuration that facilitates access to the valve cap (e.g., 1100) and the check valve (e.g., 100). Continuing, FIG. 7H shows a bottom plan view of the valve carousel 700 in accordance with one or more embodiments of the present invention.

Figure 8B:
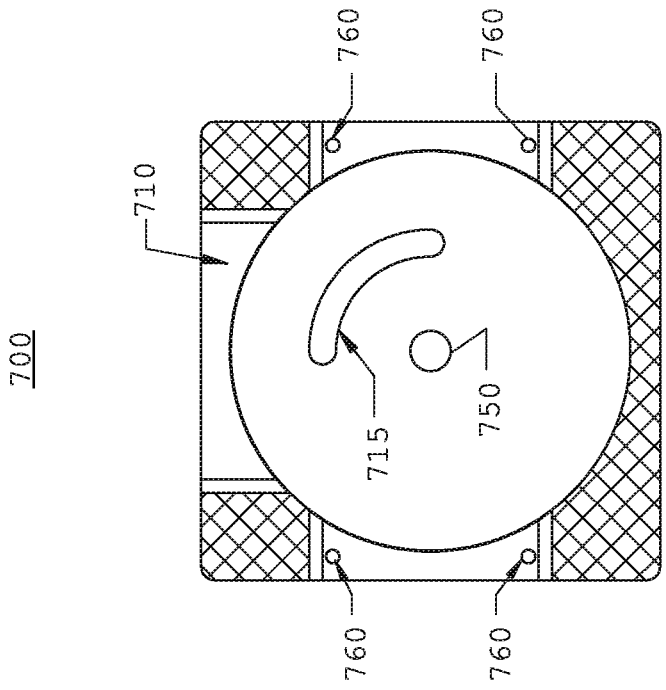
FIGS. 8A and 8B show a top plan view of a cross-sectional cut line and a corresponding cross-sectional view of a valve carousel housing of a serviceable valve carousel system in accordance with one or more embodiments of the present invention.
Figure 8A:
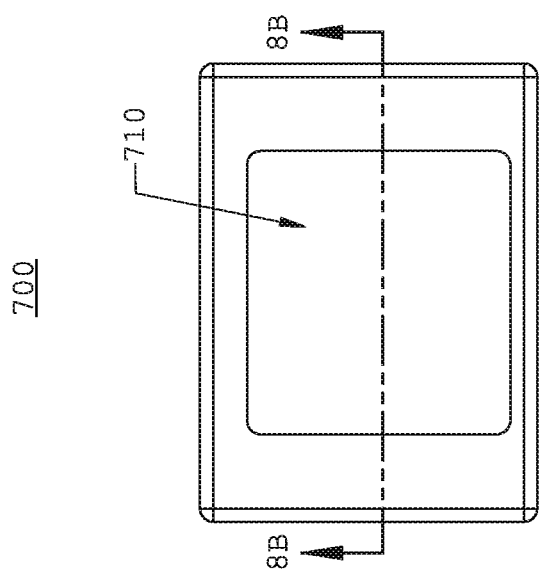

FIG. 8A shows a top plan view of a cross-sectional cut line of a valve carousel housing 700 in accordance with one or more embodiments of the present invention. Continuing, FIG. 8B shows the corresponding cross-sectional view of the valve carousel housing 700 in accordance with one or more embodiments of the present invention. Valve carousel housing 700 may include a guide pin slot 715 and a mounting post receiver 750, each of which may be cutouts formed in housing 700.

FIG. 9A shows a front facing perspective view of a valve carousel 900 of a serviceable valve carousel system (e.g., 300) in accordance with one or more embodiments of the present invention. Valve carousel 900 may include a substantially cylindrical portion 905 having substantially flat surfaces 907, 909 disposed on opposing sides of a substantially radiused surface that forms a closed circumferential shape. However, one of ordinary skill in the art will recognize that the size, shape, and configuration of the substantially flat surfaces 907, 909 and the substantially radiused surface of valve carousel 900 may vary based on an application or design in accordance with one or more embodiments of the present invention. Valve carousel 900 may include a rotation handle 910 disposed on one of the substantially flat surfaces 907 or 909 of the substantially cylindrical portion 905. Valve carousel 900 may include a valve cap receiver 930 having a size, shape, and configuration to receive a corresponding valve cap (e.g., 1100) that, when installed, forms a substantially radiused surface (not shown) that is compatible with the substantially radiused surface of the substantially cylindrical portion 905 of valve carousel 900 such that valve carousel 900 is capable of rotating within the valve carousel housing (e.g., 700). Valve carousel 900 may include a valve lumen 935 that receives a check valve (e.g., 100) at least partially disposed therein. Continuing, FIG. 9B shows a rear facing perspective view of the valve carousel 900 in accordance with one or more embodiments of the present invention. As discussed above, valve carousel 900 may include a guide pin 920 disposed on one of the substantially flat surfaces 907 or 909 of substantially cylindrical portion 905 that travels within a corresponding guide pin slot (e.g., 715) of the valve carousel housing (e.g., 700) to facilitate and restrict rotation of valve carousel 900 within the valve carousel housing (e.g., 700). Valve carousel 900 may also include a mounting post 950 disposed on one of the substantially flat surfaces 907 or 909 of the substantially cylindrical portion 905 that mates with a corresponding mounting post receiver (e.g., 750) of the valve carousel housing (e.g., 700) to secure valve carousel 900 to the valve carousel housing (e.g., 700). One of ordinary skill in the art will recognize that the size, shape, and configuration of the mounting post 950 and corresponding mounting post receiver (e.g., 750) may vary based on an application or design in accordance with one or more embodiments of the present invention.

Figure 9F:
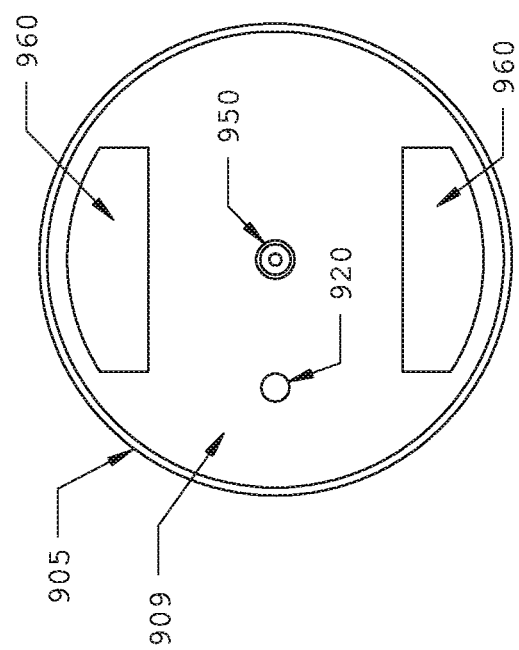
Figure 9E:
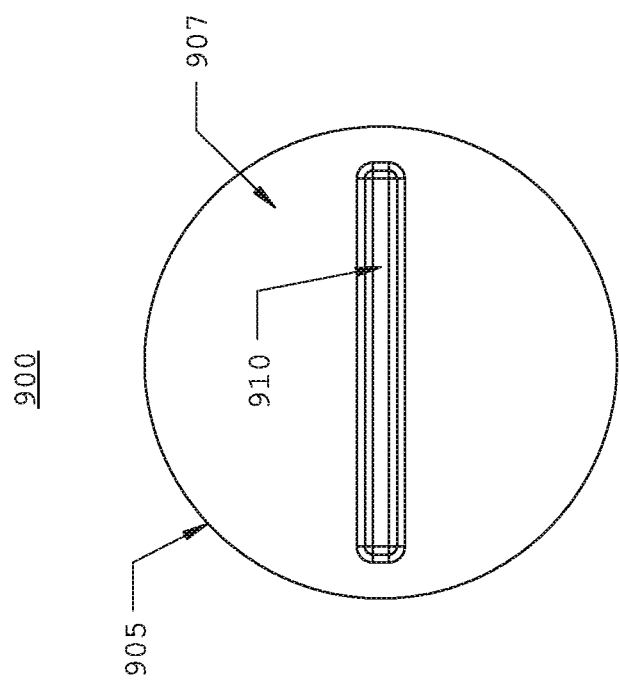

Continuing, FIG. 9C shows a right-side elevation view of valve carousel 900 in accordance with one or more embodiments of the present invention. Valve carousel 900 may include a valve lumen 935 to receive a check valve (e.g., 100) that is at least partially disposed therein. The valve retention lip (e.g., 130) may extend around valve lumen 935 holding the check valve (e.g., 100) in place. Valve lumen 935 may neck down to, and be in fluid communication with, a discharge side lumen 940. Continuing, FIG. 9D shows a left-side elevation view of valve carousel 900 in accordance with one or more embodiments of the present invention. Discharge side lumen 940 may extend to the substantially radiused surface of valve carousel 900. Continuing, FIG. 9E shows a front elevation view, FIG. 9F shows a rear elevation view, FIG. 9G shows a top plan view, and FIG. 9H shows a bottom plan view of valve carousel 900 in accordance with one or more embodiments of the present invention.

FIG. 10A shows a top plan view of a cross-sectional cut line of a valve carousel 900 of a serviceable valve carousel system (e.g., 300) in accordance with one or more embodiments of the present invention. Continuing, FIG. 10B shows the corresponding cross-sectional view of valve carousel 900. Valve cap receiver 930 provides the aperture that may receive the check valve (e.g., 100) and the valve cap (e.g., 1100). The check valve (e.g., 100) may be disposed at least partially within valve lumen 935. The valve retention lip (e.g., 135) of the check valve (e.g., 100) may catch in the area surrounding valve lumen 935, holding the check valve (e.g., 100) in place. Valve lumen 935 may neck down to discharge side lumen 940 that extends to the substantially radiused surface of valve carousel 900. One of ordinary skill in the art will recognize that the central lumen that extends through valve carousel 900 may vary in inner diameter along the length of the centralized lumen.

Figure 11C:
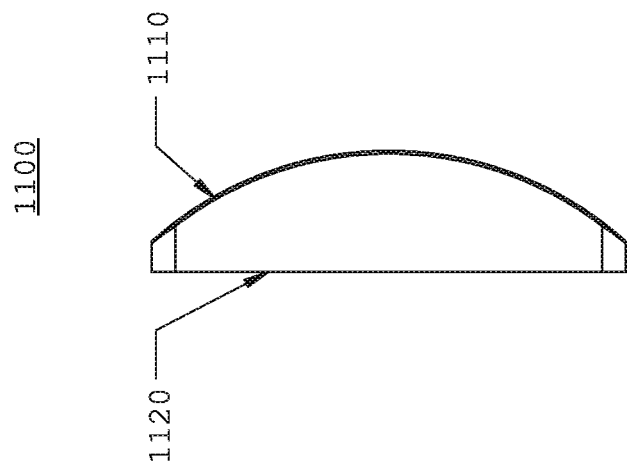
Figure 11D:
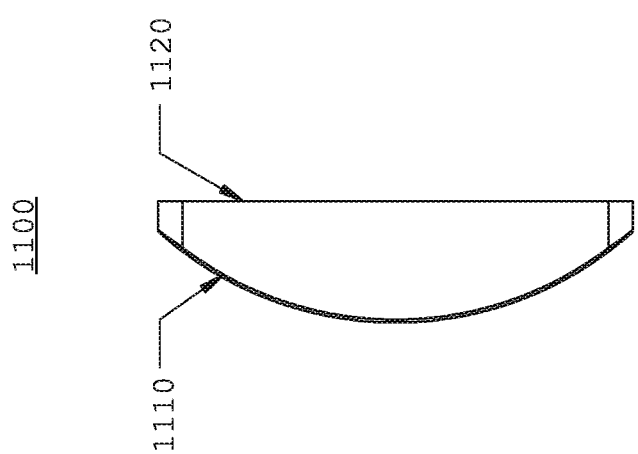
Figure 11G:
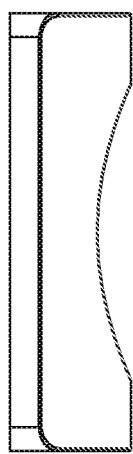
Figure 11H:
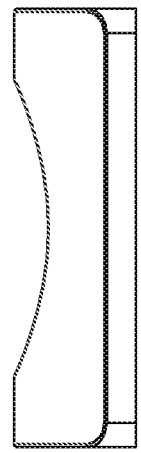

FIG. 11A shows a front facing perspective view of a valve cap 1100 of a serviceable valve carousel system (e.g., 300) in accordance with one or more embodiments of the present invention. Valve cap 1100 may include a substantially radiused surface 1110 on a first side, a substantially flat surface (e.g., 1120) on a second side (not shown), and a cap lumen 1130 that fluidly connects the first side to the second side. Continuing, FIG. 11B show a rear facing perspective view of valve cap 1100 in accordance with one or more embodiments of the present invention. The substantially flat surface 1120 on the second side of valve cap 1100 may be disposed over the check valve (e.g., 100) at least partially disposed within the valve lumen (e.g., 935) of the valve carousel (e.g., 900). Continuing, FIG. 11C shows a right-side elevation view and FIG. 11D shows a left-side elevation view of valve cap 1100 in accordance with one or more embodiments of the present invention. The substantially radiused surface 1110 of valve cap 1100 may be compatible with the substantially radiused surface of the substantially cylindrical portion (e.g., 905) of the valve carousel (e.g., 900) such that the valve carousel (e.g., 900), including valve cap 1100, may rotate when disposed within the valve carousel housing (e.g., 700). Continuing, FIG. 11E shows a front elevation view, FIG. 11F shows a rear elevation view, FIG. 11G shows top plan view, and FIG. 11H shows a bottom plan view of valve cap 1100 in accordance with one or more embodiments of the present invention.

FIG. 12A shows a front facing view of a cross-sectional cut line of a valve cap 1100 of a serviceable valve carousel system (e.g., 300) in accordance with one or more embodiments of the present invention. Continuing, FIG. 12B shows a corresponding cross-sectional view of valve cap 1100. Cap lumen 1130 may extend from the substantially radiused surface 1110 through to the substantially flat surface 1120. Substantially radiused surface 1110 may be compatible with the substantially radiused surface (not shown) of the substantially cylindrical portion (e.g., 905) of valve carousel (e.g., 900).

Figure 13D:
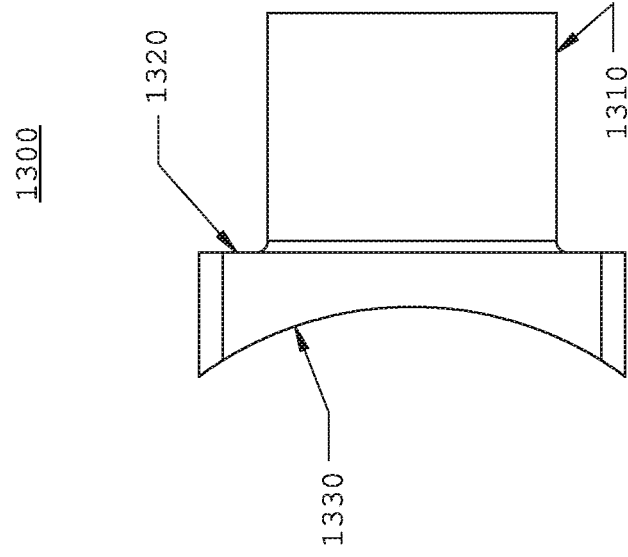
Figure 13C:
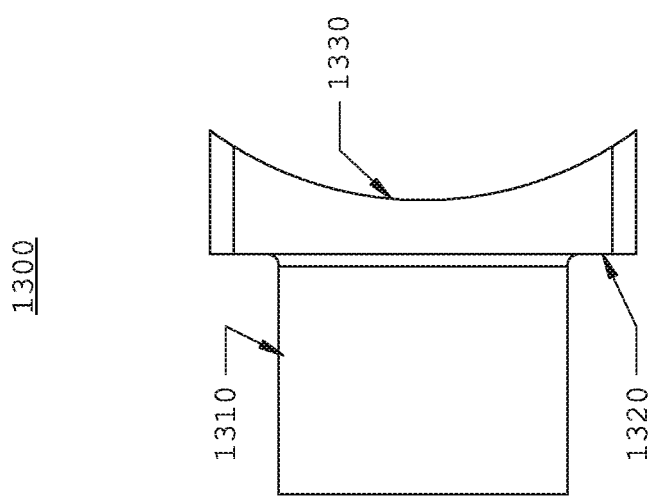

FIG. 13A shows a front facing perspective view of a hose connection-type port adapter 1300 of a serviceable valve carousel system (e.g., 300) in accordance with one or more embodiments of the present invention. Port adapter 1300 may include a protruding portion 1310, a substantially radiused interior facing surface (e.g., 1330) compatible with a substantially radiused surface of the valve carousel (e.g., 900), and a port adapter lumen 1340 that fluidly connects the protruding portion 1310 to the substantially radiused interior facing surface (e.g., 1330) of port adapter 1300. Protruding portion 1310, specifically port adapter lumen 1340, may fluidly connect with an upstream (e.g., toilet 215) or downstream (e.g., outlet vented loop 340) connection as part of the fluid discharge path. Protruding portion 1310 may have a substantially smooth exterior surface suitable for attaching a hose or piping (not shown). Continuing, FIG. 13B shows a rear facing perspective view of hose connection-type port adapter 1300 in accordance with one or more embodiments of the present invention. Port adapter 1300 may include one or more O-ring receivers 1350 to receive one or more O-rings or other sealing elements (not shown) around port adapter lumen 1340. The one or more O-rings or other sealing elements (not shown) may form a seal with either the substantially radiused surface of the valve carousel (e.g., 900) or the substantially radiused surface of the valve cap (e.g., 1100) that is compatible with the substantially radiused surface of the valve carousel (e.g., 900). Continuing, FIG. 13C shows a right-side elevation view, FIG. 13D shows a left-side elevation view, FIG. 13E shows a front elevation view, FIG. 13F shows a rear elevation view, FIG. 13G shows a top plan view, and FIG. 13H shows a bottom plan view of the hose connection-type port adapter 1300 in accordance with one or more embodiments of the present invention.

FIG. 14A shows a front facing view of a cross-sectional cut line of a hose connection-type port adapter 1300 of a serviceable valve carousel system (e.g., 300) in accordance with one or more embodiments of the present invention. Continuing, FIG. 14B shows the corresponding cross-sectional view of the hose connection-type port adapter 1300.

Figure 15C:
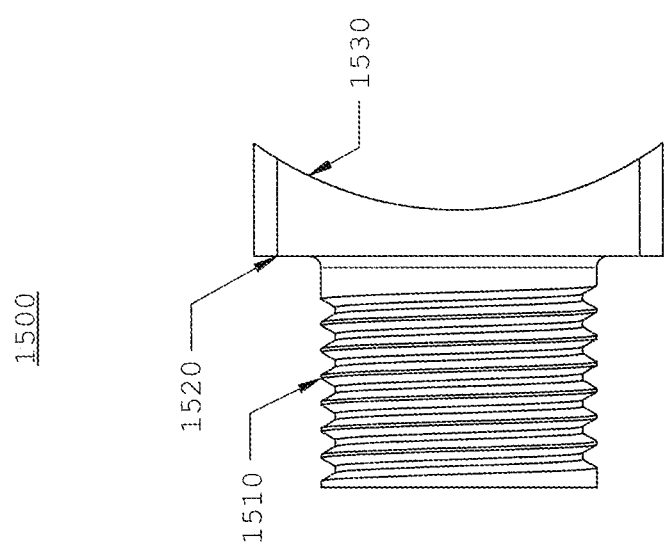
Figure 15D:
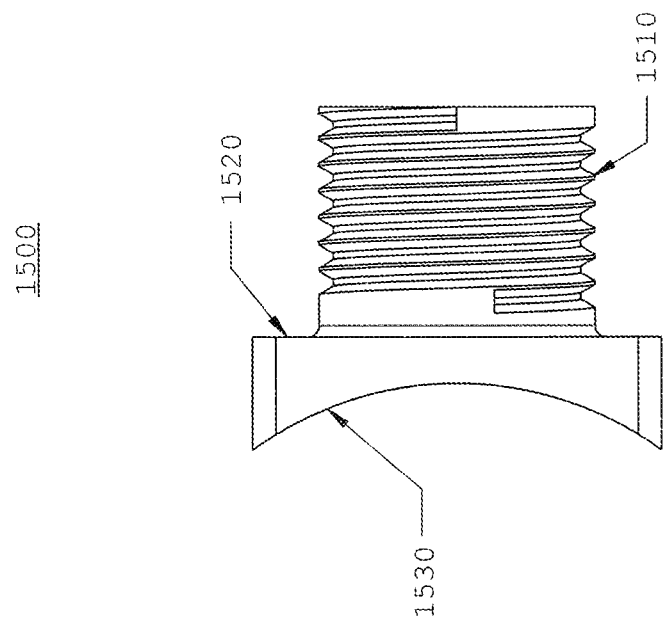

FIG. 15A shows a front facing perspective view of a threaded connection-type port adapter 1500 of a serviceable valve carousel system (e.g., 300) in accordance with one or more embodiments of the present invention. Port adapter 1500 may include a protruding portion 1510, a substantially radiused interior facing surface (e.g., 1530) compatible with a substantially radiused surface (not shown) of the substantially cylindrical portion (e.g., 905) of the valve carousel (e.g., 900), and a port adapter lumen 1540 that fluidly connects protruding portion 1510 to the substantially radiused interior facing surface (e.g., 1530) of port adapter 1500. Protruding portion 1510, specifically port adapter lumen 1540, may fluidly connect with an upstream (e.g., toilet 215) or downstream (e.g., outlet vented loop 340) connection as part of the fluid discharge path. Protruding portion 1510 may have a threaded exterior surface suitable for attaching a mated piece (not shown). Continuing, FIG. 15B shows a rear facing perspective view of threaded connection-type port adapter 1500 in accordance with one or more embodiments of the present invention. Port adapter 1500 may include one or more O-ring receivers 1550 to receive one or more O-rings or other sealing elements (not shown) around port adapter lumen 1540. The one or more O-rings or other sealing elements (not shown) may form a seal with either the substantially radiused surface of the substantially cylindrical portion (e.g., 905) of the valve carousel (e.g., 900) or the substantially radiused surface of the valve cap (e.g., 1100) that is compatible with the substantially radiused surface of the valve carousel (e.g., 900). Continuing, FIG. 15C shows a right-side elevation view, FIG. 15D shows a left-side elevation view, FIG. 15E shows a front elevation view, FIG. 15F shows a rear elevation view, FIG. 15G shows a top plan view, and FIG. 15H shows a bottom plan view of the threaded connection-type port adapter 1500 in accordance with one or more embodiments of the present invention.

FIG. 16A shows a right-side elevation view of a cross-sectional cut line of a threaded connection-type port adapter 1500 of a serviceable valve carousel system (e.g., 300) in accordance with one or more embodiments of the present invention. Continuing, FIG. 16B shows the corresponding cross-sectional view of the threaded connection-type port adapter 1500.

FIG. 17A shows a front facing perspective view of an angled flange connection-type port adapter 1700 of a serviceable valve carousel system (e.g., 300) in accordance with one or more embodiments of the present invention. Port adapter 1700 may include a protruding portion 1710, a substantially radiused interior facing surface (e.g., 1730) compatible with a substantially radiused surface (not shown) of the substantially cylindrical portion (e.g., 905) of the valve carousel (e.g., 900), and a port adapter lumen 1740 that fluidly connects the protruding portion 1710 to the substantially radiused interior facing surface (e.g., 1730) of port adapter 1700. Protruding portion 1710, specifically port adapter lumen 1740, may fluidly connect with an upstream (e.g., toilet 215) or downstream (e.g., outlet vented loop 340) connection as part of the fluid discharge path. Protruding portion 1710 may have an angled flange connector for attaching a mated piece (not shown). Continuing, FIG. 17B shows a rear facing perspective view of an angled flange connection-type port adapter 1700 in accordance with one or more embodiments of the present invention. Port adapter 1700 may include one or more O-ring receivers 1750 to receive one or more O-rings or other sealing elements (not shown) around port adapter lumen 1740. The one or more O-rings or other sealing elements (not shown) may form a seal with either the substantially radiused surface of the substantially cylindrical potion (e.g., 905) of the valve carousel (e.g., 900) or the radiused surface of the valve cap (e.g., 1100) that is compatible with the radiused surface of the valve carousel (e.g., 900). Continuing, FIG. 17C shows a right-side elevation view, FIG. 17D shows a left-side elevation view, FIG. 17E shows a front elevation view, FIG. 17F shows a rear elevation view, FIG. 17G shows a top plan view, and FIG. 17H shows a bottom plan view of the angled flange connection-type port adapter 1700 in accordance with one or more embodiments of the present invention.

Figure 18B:
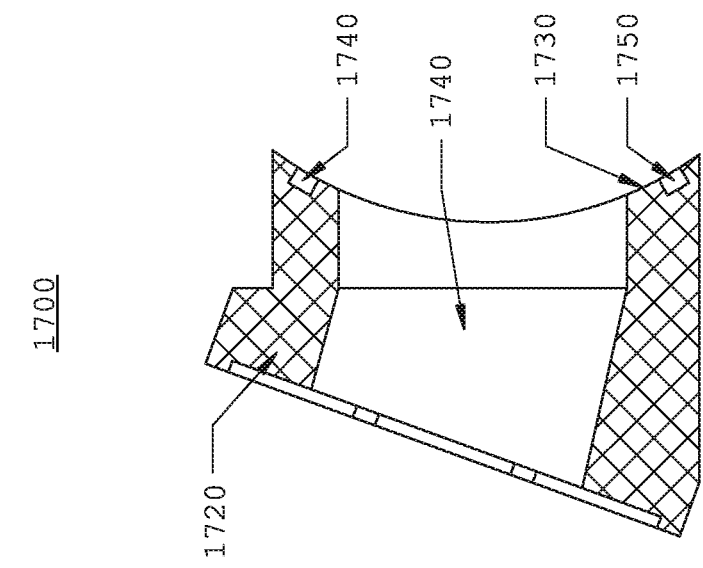
FIGS. 18A and 18B show a top plan view of a cross-sectional cut line and a cross-sectional view of an angled flange connection-type port adapter of a serviceable valve carousel system in accordance with one or more embodiments of the present invention.
Figure 18A:
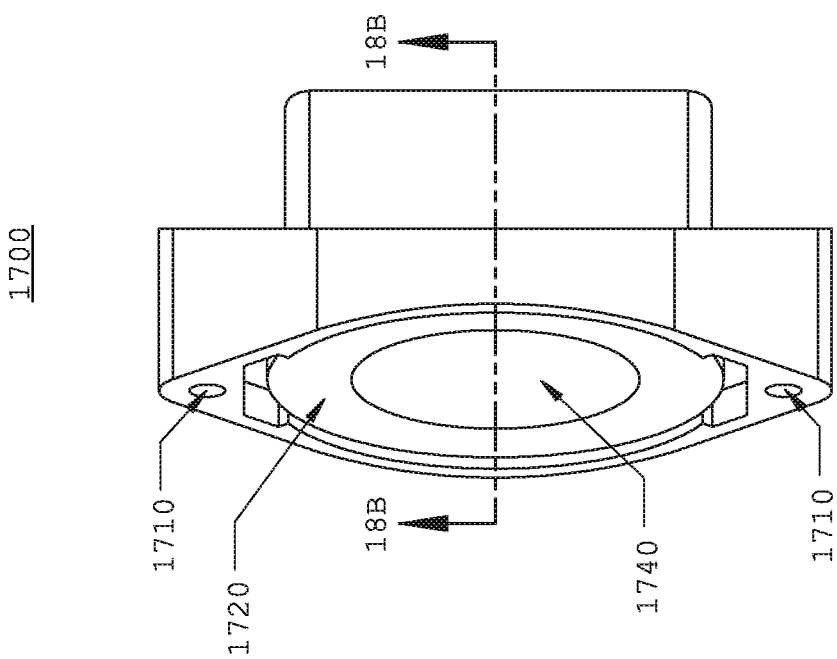

FIG. 18A shows a right-side elevation view of a cross-sectional cut line of an angled flange connection-type port adapter 1700 of a serviceable valve carousel system (e.g., 300) in accordance with one or more embodiments of the present invention. Continuing, FIG. 18B shows the corresponding cross-sectional view of the angled flanged connection-type port adapter 1700.

Figure 19C:
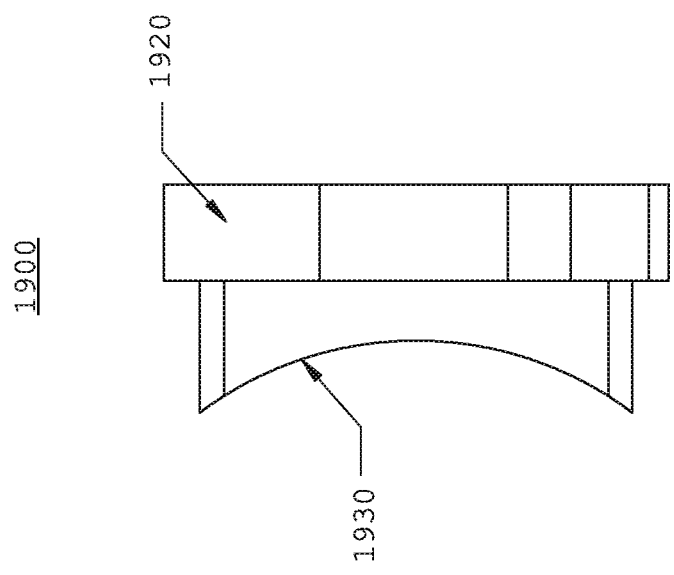
Figure 19D:
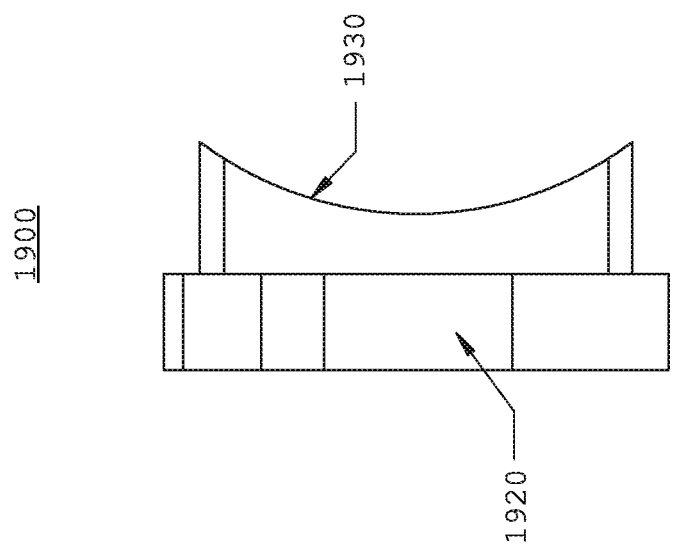
Figure 19G:
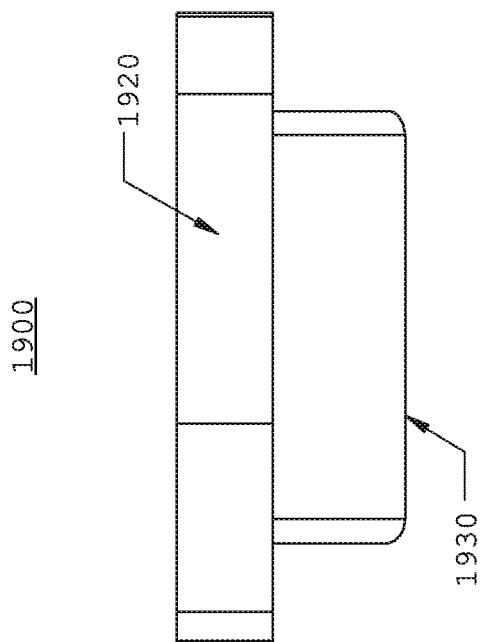
Figure 19H:
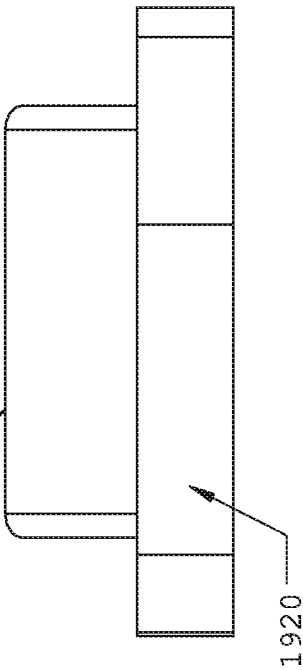

FIG. 19A shows a front facing perspective view of a rotated flange connection-type port adapter 1900 of a serviceable valve carousel system (e.g., 300) in accordance with one or more embodiments of the present invention. Port adapter 1900 may include a protruding portion 1910, a substantially radiused interior facing surface (e.g., 1930) compatible with a substantially radiused surface (not shown) of the substantially radiused cylindrical portion (e.g., 905) of the valve carousel (e.g., 900), and a port adapter lumen 1940 that fluidly connects protruding portion 1910 to the substantially radiused interior facing surface (e.g., 1930) of port adapter 1900. Protruding portion 1910, specifically port adapter lumen 1940, may fluidly connect with an upstream (e.g., toilet 215) or downstream (e.g., outlet vented loop 340) connection as part of the fluid discharge path. Protruding portion 1910 may have a rotated flange connector for attaching a mated piece (not shown). Continuing, FIG. 19B shows a rear facing perspective view of rotated flange connection-type port adapter 1900 in accordance with one or more embodiments of the present invention. Port adapter 1900 may include one or more O-ring receivers 1950 to receive one or more O-rings or other sealing elements (not shown) around port adapter lumen 1940. The one or more O-rings or other sealing elements (not shown) may form a seal with either the substantially radiused surface of the substantially cylindrical portion (e.g., 905) of the valve carousel (e.g., 900) or the substantially radiused surface of the valve cap (e.g., 1100) that is compatible with the substantially radiused surface of the substantially cylindrical potion (e.g., 905) of the valve carousel (e.g., 900). Continuing, FIG. 19C shows a right-side elevation view, FIG. 19D shows a left-side elevation view, FIG. 19E shows a front elevation view, FIG. 19F shows a rear elevation view, FIG. 19G shows a top plan view, and FIG. 19H shows a bottom plan view of rotated flange connection-type port adapter 1900 in accordance with one or more embodiments of the present invention.

FIG. 20A shows a right-side elevation view of a cross-sectional cut line of a rotated flange threaded connection-type port adapter 1900 of a serviceable valve carousel system (e.g., 300) in accordance with one or more embodiments of the present invention. Continuing, FIG. 20B shows the corresponding cross-sectional view of the rotated flanged connection-type port adapter 1900 in accordance with one or more embodiments of the present invention.

Figure 21G:
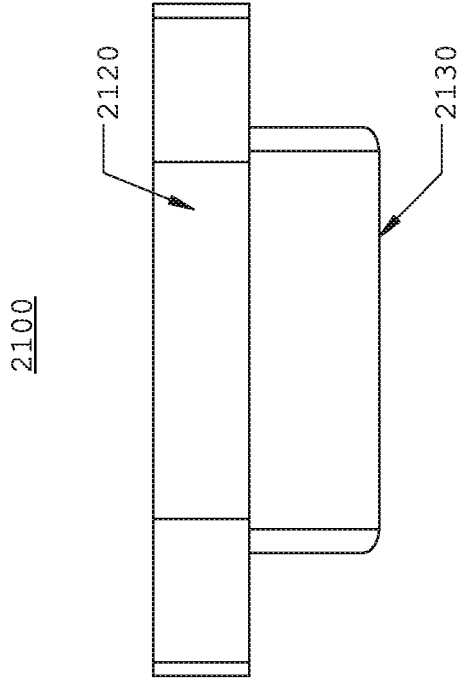
Figure 21H:
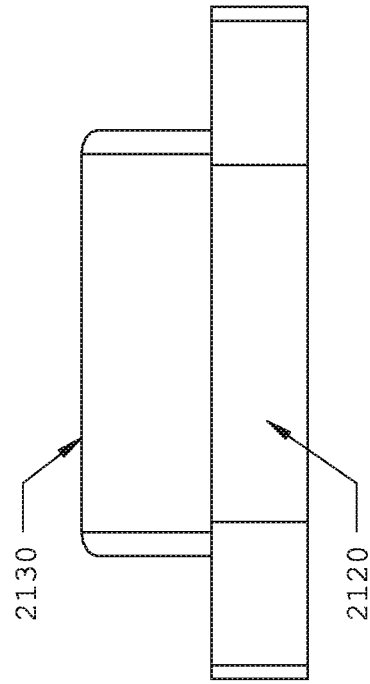

FIG. 21A shows a front facing perspective view of a straight flange connection-type port adapter 2100 of a serviceable valve carousel system (e.g., 300) in accordance with one or more embodiments of the present invention. Port adapter 2100 may include a protruding portion 2110, a substantially radiused interior facing surface (e.g., 2130) compatible with a substantially radiused surface (not shown) of the substantially cylindrical portion (e.g., 905) of the valve carousel (e.g., 900), and a port adapter lumen 2140 that fluidly connects the protruding portion 2110 to the substantially radiused interior facing surface (e.g., 2130) of port adapter 2100. Protruding portion 2110, specifically port adapter lumen 2140, may fluidly connect with an upstream (e.g., toilet 215) or downstream (e.g., outlet vented loop 340) connection as part of the fluid discharge path. Protruding portion 2110 may have a straight flange connector for attaching a mated piece (not shown). Continuing, FIG. 21B shows a rear facing perspective view of straight flange connection-type port adapter 2100 in accordance with one or more embodiments of the present invention. Port adapter 2100 may include one or more O-ring receivers 2150 to receive one or more O-rings or other sealing elements (not shown) around port adapter lumen 2140. The one or more O-rings or other sealing elements (not shown) may form a seal with either the substantially radiused surface of the substantially cylindrical portion (e.g., 905) of the valve carousel (e.g., 900) or the substantially radiused surface of the valve cap (e.g., 1100) that is compatible with the substantially radiused surface of the substantially cylindrical portion (e.g., 905) of the valve carousel (e.g., 900). Continuing, FIG. 21C shows a right-side elevation view, FIG. 21D shows a left-side elevation view, FIG. 21E shows a front elevation view, FIG. 21F shows a rear elevation view, FIG. 21G shows a top plan view, and FIG. 21H shows a bottom plan view of straight flange connection-type port adapter 2100 in accordance with one or more embodiments of the present invention.

FIG. 22A shows a right-side elevation view of a cross-sectional cut line of a straight flange connection-type port adapter 2100 of a serviceable valve carousel system (e.g., 300) in accordance with one or more embodiments of the present invention. Continuing, FIG. 22B shows the corresponding cross-sectional view of the straight flange connection-type port adapter 2100.

One of ordinary skill in the art will recognize that because first port adapter 320 and second port adapter 330 are modular, the appropriate type or kind of port adapter may be selected for a given application ensuring broad compatibility with a wide variety of existing marine sanitation systems (e.g., 200). As such, each of first port adapter 320 and second port adapter 330 may be a hose connection-type, threaded connection-type, angled flange connection-type, rotated flange connection-type, straight flange connection-type, or any other type or kind of plumbing connection suitable for sanitation systems.

Notwithstanding the above, in one or more embodiments of the present invention, a serviceable valve carousel system (e.g., 300) may include a first port adapter (e.g., 320) and a second port adapter (e.g., 330) that are integrated with the valve carousel housing (e.g., 700) forming a unibody member. In certain embodiments, a serviceable valve carousel system (e.g., similar to 300) may include a valve carousel having a substantially cylindrical portion (e.g., 905), a valve cap receiver (e.g., 930) formed in a substantially radiused portion of the substantially cylindrical portion (e.g., 905), a valve lumen (e.g., 935), and a removable valve cap (e.g., 1100) and a valve carousel housing (e.g., similar to 700) having a valve carousel receiver (e.g., 740), a first integrated port (e.g., similar to 320), a valve service port (e.g., 710), and a second integrated port (similar to 330).

Advantages of one or more embodiments of the present invention may include one or more of the following:

In one or more embodiments of the present invention, a serviceable valve carousel system provides for the removal and replacement of a worn check valve without the undesirable discharge of residual waste in the system, the leakage of offensive odors, and does not require the use of any tools or catches.

In one or more embodiments of the present invention, a serviceable valve carousel system facilitates the removal and replacement of worn check valves in a simple tool-less operation that takes mere second to perform and does not require the handling of raw or untreated sewage.

In one or more embodiments of the present invention, a serviceable valve carousel system may be used on existing marine sanitation systems. In certain embodiments, a serviceable valve carousel system may include a valve carousel housing that includes a first port adapter receiver and a second port adapter receiver that allow the use of various types or kinds of port adapters to facilitate connectivity to the existing marine sanitation system. During installation, the appropriate first port adapter and second port adapter may be selected to facilitate installation of the serviceable valve carousel system. Each of the first port adapter and the second port adapter may be a hose connection-type, a threaded connection-type, a straight flange connection-type, an angled flange connection-type, or a rotated flange connection-type. As such, regardless of the type or kind of existing marine sanitation system, the serviceable valve carousel system may be easily retrofitted for compatible use.

In other embodiments, a serviceable valve carousel system may be used with new installations of marine sanitation systems.

In one or more embodiments of the present invention, a serviceable valve carousel system simplifies the process by which worn check valves are removed and replaced and does not require the handling of residual waste.

In one or more embodiments of the present invention, a serviceable valve carousel system reduces the amount of time required to remove and replace worn check valves.

In one or more embodiments of the present invention, a serviceable valve carousel system reduces the cost associated with removed and replacing worn check valves.

In one or more embodiments of the present invention, a serviceable valve carousel system substantially eliminates the exposure to residual waste when removing and replacing worn check valves.

In one or more embodiments of the present invention, a serviceable valve carousel system does not require the use of tools, requiring only hand force only, to remove and replace a worn check valve.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should be limited only by the appended claims.

What is claimed is:

1. A serviceable valve carousel system comprising:
    a rotatable valve carousel comprising a substantially cylindrical portion, a guide pin disposed on a substantially flat surface of the substantially cylindrical portion, a valve cap receiver, a valve lumen, and a removable valve cap;
    a valve carousel housing comprising a valve carousel receiver, a first port adapter receiver, a valve service port, and a second port adapter receiver;
    a first port adapter; and
    a second port adapter,
    wherein the valve cap comprises a substantially radiused portion compatible with a substantially radiused portion of the substantially cylindrical portion such that the valve carousel may rotate when disposed within the valve carousel housing.

2. The system of claim 1, wherein the valve carousel is rotatable between a first state that allows fluid communication between the first port adapter and the second port adapter through a valve at least partially disposed within the valve lumen and a second state that allows the valve to be removed and replaced via the valve service port.

3. The system of claim 1, wherein the valve carousel further comprises a rotation handle disposed on a substantially flat surface of the substantially cylindrical portion.

4. The system of claim 1, wherein the valve carousel further comprises a mounting post disposed on a substantially flat surface of the substantially cylindrical portion.

5. The system of claim 1, wherein the valve carousel further comprises a port lumen in fluid communication with the valve lumen or the valve disposed therein.

6. The system of claim 1, wherein the valve cap comprises a substantially radiused surface on a first side, a substantially flat surface on a second side, and a cap lumen that fluidly connects the first side to the second side.

7. The system of claim 1, wherein the valve cap is configured to be disposed over a valve at least partially disposed within the valve lumen.

8. The system of claim 1, wherein the valve carousel housing further comprises a mounting post receiver.

9. The system of claim 1, wherein the valve carousel housing further comprises a guide pin slot that restricts rotation of the valve carousel between a first state and a second state.

10. The system of claim 1, wherein the valve service port is disposed in between the first port adapter receiver and the second port adapter receiver.

11. The system of claim 1, wherein the valve service port of the valve carousel housing comprises an aperture through which the valve cap and a valve are removable.

12. The system of claim 1, wherein the first port adapter comprises:
- a first protruding portion;
- a first substantially radiused interior facing surface compatible with a substantially radiused surface of the valve carousel;
- a first lumen that fluidly connects the first protruding portion and the first substantially radiused interior facing surface; and
- a first O-ring receiver formed in the first substantially radiused interior facing surface around the first lumen.

13. The system of claim 1, wherein the second port adapter comprises:
- a second protruding portion;
- a second substantially radiused interior facing surface compatible with a substantially radiused surface of the valve carousel;
- a second lumen that fluidly connects the second protruding portion and the second substantially radiused interior facing surface; and
- a second O-ring receiver formed in the second substantially radiused interior facing surface around the second lumen.

14. The system of claim 1, wherein each of the first port adapter and the second port adapter comprises a hose connection, a threaded connection, a straight flange connection, an angled flange connection, or a rotated flange connection.

* * * * *